(12) United States Patent  
Wang et al.

(10) Patent No.: US 12,520,236 B2  
(45) Date of Patent: Jan. 6, 2026

(54) SLEEP CONTROL METHOD FOR MOBILE ROUTING DEVICE AND MOBILE ROUTING DEVICE

(71) Applicant: Huawei Technologies Co., Ltd., Shenzhen (CN)

(72) Inventors: Weigang Wang, Xi'an (CN); Xiong Shen, Xi'an (CN); Haoran Yan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 470 days.

(21) Appl. No.: 18/022,089

(22) PCT Filed: Jul. 26, 2021

(86) PCT No.: PCT/CN2021/108506  
§ 371 (c)(1),  
(2) Date: Feb. 17, 2023

(87) PCT Pub. No.: WO2022/037368  
PCT Pub. Date: Feb. 24, 2022

(65) Prior Publication Data  
US 2023/0309012 A1    Sep. 28, 2023

(30) Foreign Application Priority Data

Aug. 20, 2020    (CN) .......................... 202010845867.2

(51) Int. Cl.  
*H04W 52/02* (2009.01)  
*H04W 76/25* (2018.01)  
(Continued)

(52) U.S. Cl.  
CPC ....... *H04W 52/0206* (2013.01); *H04W 76/30* (2018.02)

(58) Field of Classification Search  
CPC ............. H04W 52/02; H04W 52/0206; H04W 52/0254; H04W 76/25; H04W 76/30; H04W 80/06; Y02D 30/70  
See application file for complete search history.

(56) References Cited

U.S. PATENT DOCUMENTS 8,363,620 B2 * 1/2013 Hirano .................. H04W 76/20  
370/408  
8,774,090 B2 * 7/2014 Giaretta ................ H04W 60/06  
370/328  
(Continued)

FOREIGN PATENT DOCUMENTS

EP          3349515 A1    7/2018

*Primary Examiner* — Jenee Holland  
(74) *Attorney, Agent, or Firm* — Slater Matsil, LLP

(57) ABSTRACT

A mobile routing device includes: a processor, and a memory storing a computer program, which, when executed by the processor, causes the mobile routing device to perform: obtaining identification information of M mobile devices connected to the mobile routing device; after detecting that N mobile devices in the M mobile devices are disconnected from the mobile routing device, obtaining identification information and TCP link information of the N mobile devices, where the TCP link information indicates application servers and N is less than or equal to M; after obtaining the identification information and the TCP link information, sending disconnection messages to the application servers to indicate that TCP links corresponding to the N mobile devices and between the application servers and the mobile routing device are disconnected; and after detecting that N is equal to M, entering a sleep state.

20 Claims, 12 Drawing Sheets

(51) Int. Cl.
*H04W 76/30* (2018.01)
*H04W 80/06* (2009.01)

(56) References Cited

U.S. PATENT DOCUMENTS

| | | | | |
|---|---|---|---|---|
| 10,523,432 | B2* | 12/2019 | Nix | H04L 9/3247 |
| 2002/0057658 | A1* | 5/2002 | Lim | H04W 36/0033 |
| | | | | 370/331 |
| 2008/0250466 | A1* | 10/2008 | Ke | H04N 21/6581 |
| | | | | 348/E7.071 |
| 2012/0269126 | A1 | 10/2012 | Wang et al. | |
| 2013/0083799 | A1* | 4/2013 | Xie | H04L 69/326 |
| | | | | 370/394 |
| 2013/0124618 | A1* | 5/2013 | Zhong | H04W 12/068 |
| | | | | 709/203 |
| 2014/0335837 | A1* | 11/2014 | Zhu | H04W 4/16 |
| | | | | 455/415 |
| 2019/0155341 | A1* | 5/2019 | Sobel | G06F 1/1698 |
| 2019/0173673 | A1* | 6/2019 | Nix | H04L 9/14 |
| 2020/0413296 | A1* | 12/2020 | Chen | H04W 36/00 |
| 2021/0049898 | A1* | 2/2021 | Wang | H04L 12/10 |

\* cited by examiner

SLEEP CONTROL METHOD FOR MOBILE ROUTING DEVICE AND MOBILE ROUTING DEVICE

CROSS-REFERENCE TO RELATED APPLICATIONS

This application is a National Stage of International Application No. PCT/CN2021/108506 filed on Jul. 26, 2021, which claims priority to Chinese Patent Application No. 202010845867.2 filed on Aug. 20, 2020. The disclosures of the aforementioned applications are hereby incorporated by reference in their entireties.

TECHNICAL FIELD

This disclosure relates to the field of mobile routing devices, and in particular, to a sleep control method for a mobile routing device and a mobile routing device.

BACKGROUND

A mobile routing device can support multi-device access, so that connected devices do not use mobile data of the connected devices when accessing the Internet. In addition, the mobile routing device is portable, and is widely used in a scenario in which a non-mobile routing device cannot be provided or is inconvenient to be provided, for example, a scenario in which a tour group provides a free Internet access service for passengers during travel through the mobile routing device. However, running duration of the mobile routing device is limited by battery power of the mobile routing device. How to prolong the running duration of the mobile routing device without affecting a normal service becomes our requirement.

SUMMARY

To resolve the foregoing technical problem, this disclosure provides a sleep control method for a mobile routing device and a mobile routing device, to reduce power consumption of the mobile routing device by optimizing and controlling sleep of the mobile routing device, so that standby duration is prolonged, and running duration of the mobile routing device is prolonged.

According to a first aspect, a mobile routing device is provided. The mobile routing device is connected to M mobile devices in a wireless communication manner, and the mobile routing device includes: one or more processors, one or more memories, and one or more computer programs. The one or more computer programs are stored in the one or more memories, and when the computer programs are executed by the one or more processors, the mobile routing device is enabled to perform the following operations: obtaining identification information of the M mobile devices; after detecting that N mobile devices in the M mobile devices are disconnected from the mobile routing device, obtaining identification information and TCP link information of the N mobile devices, where the TCP link information of the N mobile devices indicates one or more application servers; after obtaining the identification information and the TCP link information of the N mobile devices, sending disconnection messages to the application servers, where the disconnection messages are used to indicate to disconnect TCP links that correspond to the N mobile devices and are located between the mobile routing device and the one or more application servers; and after detecting that N is equal to M, the mobile routing device enters a sleep state, where both M and N are positive integers greater than or equal to 1, and N is less than or equal to M. In this way, the mobile routing device learns, by determining, that all mobile devices connected to the mobile routing device are disconnected, then the mobile routing device may enter a sleep state after sending disconnection messages to the corresponding application servers, and is not frequently woken up by the application servers, to reduce power consumption of the mobile routing device and prolong running duration of the mobile routing device.

According to the first aspect, the mobile routing device further performs the following operation: after detecting that N is not equal to M, the mobile routing device obtains identification information of K mobile devices connected to the mobile routing device, and updates M to K, where K is a positive integer greater than or equal to 1. In this way, a next cycle starts after N is not equal to M. In a new cycle, M is updated. In addition, N is also updated, and the mobile routing device determines again, that is, determines whether new N is equal to new M. This process repeats until N is equal to M, and then the mobile routing device enters a sleep state.

According to any one of the first aspect or the foregoing implementations of the first aspect, after the obtaining identification information of the M mobile devices, the mobile routing device further performs the following operations: receiving one or more first messages of the N mobile devices; and the mobile routing device detects, in response to the one or more first messages, that the N mobile devices in the M mobile devices are disconnected from the mobile routing device. In this way, a specific manner in which the mobile devices are disconnected from the mobile routing device is provided. The mobile routing device receives the first messages sent by the mobile devices, to learn that the mobile devices are disconnected from the mobile routing device. In other words, the mobile devices may actively disconnect connections between the mobile devices and the mobile routing device in this manner.

According to any one of the first aspect or the foregoing implementations of the first aspect, after the obtaining identification information of the M mobile devices, the mobile routing device further performs the following operation: after receiving no message of the N mobile devices within preset duration, the mobile routing device detects that the N mobile devices in the M mobile devices are disconnected from the mobile routing device. In this way, another specific manner in which the mobile devices are disconnected from the mobile routing device is provided. The mobile routing device detects that no message sent by the mobile devices is received within the preset duration, to learn that the mobile devices are disconnected from the mobile routing device. In other words, the mobile routing device may determine, in this manner, that the mobile devices are disconnected from the mobile routing device. For example, the mobile devices are disconnected from the mobile routing device due to interference.

According to any one of the first aspect or the foregoing implementations of the first aspect, the messages of the N mobile devices are keepalive messages, and the keepalive messages are used to indicate that the N mobile devices keep connections to the mobile routing device. In this way, the mobile routing device may determine whether the keepalive messages sent by the mobile devices are detected within the preset duration, to determine whether the mobile devices are disconnected from the mobile routing device.

According to any one of the first aspect or the foregoing implementations of the first aspect, the mobile routing device is powered by a battery. In this way, a power supply source of the mobile routing device is further clarified.

According to a second aspect, a mobile routing device is provided. The mobile routing device is connected to M mobile devices in a wireless communication manner, and P TCP links are established between the M mobile devices and N application servers through the mobile routing device. The mobile routing device includes: one or more processors; one or more memories; and one or more computer programs. The one or more computer programs are stored in the one or more memories, and when the computer programs are executed by the one or more processors, the mobile routing device is enabled to perform the following operations: obtaining information about the P TCP links; after detecting that no data is transmitted on Q TCP links in the P TCP links within preset duration, sending disconnection messages to T application servers indicated by the Q TCP links, where the disconnection messages are used to indicate to disconnect TCP links that correspond to the Q TCP links and that are located between the mobile routing device and the T application servers; and after detecting that Q is equal to P, the mobile routing device enters a sleep state, where M, N, P, Q, and T are all positive integers greater than or equal to 1, Q is less than or equal to P, and T is less than or equal to N. In this way, the mobile routing device determines that no data is transmitted on TCP links between the mobile devices and the mobile routing device within the preset duration, to learn that a specific quantity of TCP links are disconnected, and after a quantity of disconnected TCP links is equal to a quantity of all TCP links, the mobile routing device sends disconnection messages to the corresponding application servers, and then enters a sleep state. Therefore, the mobile routing device is not frequently woken up by the application servers, to reduce power consumption of the mobile routing device and prolong running duration of the mobile routing device.

According to the second aspect, the mobile routing device further performs the following operation: after detecting that Q is not equal to P, the mobile routing device obtains information about L TCP links, and updates P to L, where L is a positive integer greater than or equal to 1. In this way, a next cycle starts after Q is not equal to P. In a new cycle, P is updated. In addition, Q is also updated, and the mobile routing device determines again, that is, determines whether new Q is equal to new P. This process repeats until Q is equal to P, and then the mobile routing device enters a sleep state.

According to any one of the second aspect or the foregoing implementations of the second aspect, the detecting that no data is transmitted on Q TCP links in the P TCP links within preset duration includes: detecting that no data from the M mobile devices is transmitted on the Q TCP links in the P TCP links within the preset duration. In this way, a specific manner of determining that no data is transmitted on Q TCP links between the mobile devices and the mobile routing device within the preset duration is further clarified.

According to any one of the second aspect or the foregoing implementations of the second aspect, the mobile routing device is powered by a battery. In this way, a power supply source of the mobile routing device is further clarified.

According to a third aspect, a sleep control method for a mobile routing device is provided. The method is applied to the mobile routing device, where the mobile routing device is connected to M mobile devices in a wireless communication manner. The method includes: The mobile routing device obtains identification information of the M mobile devices; after detecting that N mobile devices in the M mobile devices are disconnected from the mobile routing device, the mobile routing device obtains identification information and TCP link information of the N mobile devices, where the TCP link information of the N mobile devices indicates one or more application servers; after obtaining the identification information and the TCP link information of the N mobile devices, the mobile routing device sends disconnection messages to the application servers, where the disconnection messages are used to indicate to disconnect TCP links that correspond to the N mobile devices and that are located between the mobile routing device and the one or more application servers; and after detecting that N is equal to M, the mobile routing device enters a sleep state, where both M and N are positive integers greater than or equal to 1, and N is less than or equal to M.

According to the third aspect, the method further includes: after detecting that N is not equal to M, the mobile routing device obtains identification information of K mobile devices connected to the mobile routing device, and updates M to K, where K is a positive integer greater than or equal to 1.

According to any one of the third aspect or the foregoing implementations of the third aspect, after the obtaining identification information of the M mobile devices, the method further includes: receiving one or more first messages of the N mobile devices; and the mobile routing device detects, in response to the one or more first messages, that the N mobile devices in the M mobile devices are disconnected from the mobile routing device.

According to any one of the third aspect or the foregoing implementations of the third aspect, after the obtaining identification information of the M mobile devices, the method further includes: after receiving no message of the N mobile devices within preset duration, the mobile routing device detects that the N mobile devices in the M mobile devices are disconnected from the mobile routing device.

According to any one of the third aspect or the foregoing implementations of the third aspect, the messages of the N mobile devices are keepalive messages, and the keepalive messages are used to indicate that the N mobile devices keep connections to the mobile routing device.

According to any one of the third aspect or the foregoing implementations of the third aspect, the mobile routing device is powered by a battery.

The third aspect and any one of the implementations of the third aspect respectively correspond to the first aspect and any one of the implementations of the first aspect. For technical effects corresponding to any one of the third aspect and the implementations of the third aspect, refer to the technical effects corresponding to any one of the first aspect and the implementations of the first aspect. Details are not described herein again.

According to a fourth aspect, a sleep control method for a mobile routing device is provided. The method is applied to the mobile routing device, where the mobile routing device is connected to M mobile devices in a wireless communication manner, and P TCP links are established between the M mobile devices and N application servers through the mobile routing device. The method includes: obtaining information about the P TCP links; after detecting that no data is transmitted on Q TCP links in the P TCP links within preset duration, sending disconnection messages to T application servers indicated by the Q TCP links, where the disconnection messages are used to indicate to disconnect TCP links that correspond to the Q TCP links and that are located between the mobile routing device and the T application servers; and after detecting that Q is equal to P, the mobile routing device enters a sleep state, where M, N, P, Q, and T are all positive integers greater than or equal to 1, Q is less than or equal to P, and T is less than or equal to N.

According to the fourth aspect, the method further includes: after detecting that Q is not equal to P, the mobile routing device obtains information about L TCP links, and updates P to L, where L is a positive integer greater than or equal to 1.

According to any one of the fourth aspect or the foregoing implementations of the fourth aspect, the detecting that no data is transmitted on Q TCP links in the P TCP links within preset duration includes: detecting that no data from the M mobile devices is transmitted on the Q TCP links in the P TCP links within the preset duration.

According to any one of the fourth aspect or the foregoing implementations of the fourth aspect, the mobile routing device is powered by a battery.

The fourth aspect and any one of the implementations of the fourth aspect respectively correspond to the second aspect and any one of the implementations of the second aspect. For technical effects corresponding to any one of the fourth aspect and the implementations of the fourth aspect, refer to the technical effects corresponding to any one of the second aspect and the implementations of the second aspect. Details are not described herein again.

According to a fifth aspect, a computer-readable storage medium is provided. The computer readable storage medium includes a computer program, and when the computer program is run on a mobile routing device, the mobile routing device is enabled to perform the method according to any one of the third aspect and the implementations of the third aspect, or the method according to any one of the fourth aspect and the implementations of the fourth aspect.

The fifth aspect and any one of the implementations of the fifth aspect respectively correspond to the third aspect and any one of the implementations of the third aspect, and the fourth aspect and any one of the implementations of the fourth aspect. For technical effects corresponding to any one of the fifth aspect and the implementations of the fifth aspect, refer to the technical effects corresponding to any one of the third aspect and the implementations of the third aspect, and any one of the fourth aspect and the implementations of the fourth aspect. Details are not described herein again.

According to a sixth aspect, a computer program product is provided. When the computer program product is run on a mobile routing device, the mobile routing device is enabled to perform the method according to any one of the third aspect and the implementations of the third aspect, or the method according to any one of the fourth aspect and the implementations of the fourth aspect.

The sixth aspect and any one of the implementations of the sixth aspect respectively correspond to the third aspect and any one of the implementations of the third aspect, and the fourth aspect and any one of the implementations of the fourth aspect. For technical effects corresponding to any one of the sixth aspect and the implementations of the sixth aspect, refer to the technical effects corresponding to any one of the third aspect and the implementations of the third aspect, and any one of the fourth aspect and the implementations of the fourth aspect. Details are not described herein again.

DETAILED DESCRIPTION OF ILLUSTRATIVE EMBODIMENTS

The following describes the technical solutions in embodiments of this disclosure with reference to the accompanying drawings in embodiments of this disclosure. In description in embodiments of this disclosure, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this disclosure, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

In embodiments of this disclosure, the word "example", "for example", or the like is used to represent giving an example, an illustration, or a description. Any embodiment or design scheme described as "example" or "for example"

in embodiments of this disclosure should not be explained as being more preferred or having more advantages than another embodiment or design scheme. Exactly, use of the word "example", "for example", or the like is intended to present a relative concept in a specific manner.

Figure 1:
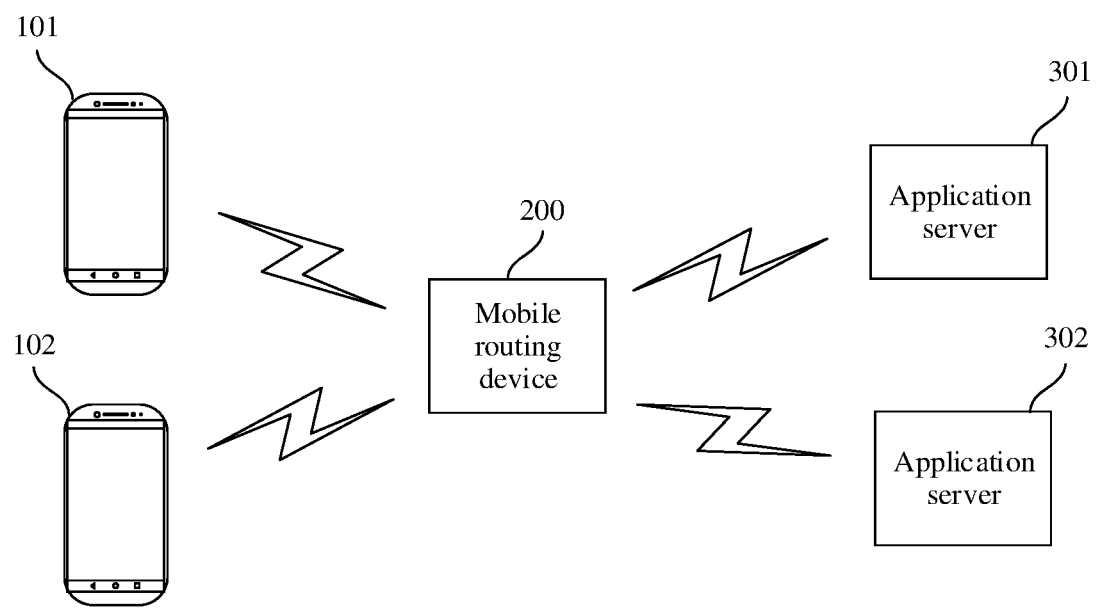
FIG. 1 is a schematic diagram of a scenario of a sleep control method for a mobile routing device according to an embodiment of this disclosure.

FIG. 1 is a schematic diagram of a scenario of a sleep control method for a mobile routing device according to an embodiment of this disclosure. As shown in FIG. 1, a mobile device 101 and a mobile device 102 wirelessly communicate with a mobile routing device 200, and the mobile routing device 200 wirelessly communicates with an application server 301 to an application server 302 respectively. In other words, both the mobile device 101 and the mobile device 102 respectively access the application server 301 and the application server 302 through the mobile routing device 200 in a wireless communication manner, to finally implement data transmission between the mobile device 101 and the mobile device 102 and the application server 301 and the application server 302. The mobile device 101 and the mobile device 102 are merely examples, and are not limited to only two mobile devices, and may alternatively be any quantity of mobile devices. Likewise, the application server 301 and the application server 302 are also merely examples, and are not limited to only two application servers, and may alternatively be another quantity of application servers. In addition, a quantity of application servers is not associated with a quantity of mobile devices, and there may be any quantity of both application servers and mobile devices. In addition, the mobile routing device 200 is not connected to an external power supply, and is powered only by a battery.

For ease of description, the following describes a data transmission process by using an example in which the mobile device 101 wirelessly communicates with the application server 301 through the mobile routing device 200. After a transmission link is established between the mobile device 101 and the application server 301, the mobile device 101 sends a service request to the application server 301 through the mobile routing device 200, and the application server 301 sends a service response to the mobile device 101 through the mobile routing device 200. The transmission link may be a hypertext transfer protocol (hypertext transfer protocol, HTTP) link, a secure hypertext transfer protocol (secure hypertext transfer protocol, HTTPS) link, or the like. For example, the transmission link may be a transmission control protocol (transmission control protocol, TCP) link.

Optionally, the mobile device 101 wirelessly communicates with the mobile routing device 200 in a first wireless communication manner, and the mobile routing device 200 wirelessly communicates with the application server 301 in a second wireless communication manner. The first wireless communication manner may be one of short-distance communication manners such as Bluetooth (Bluetooth, BT), a wireless local area network (wireless local area networks, WLAN) (for example, Wi-Fi), Zigbee, near field communication (near field communication, NFC), and infrared (infrared, IR). The second wireless communication manner may be a communication manner such as 2G/3G/4G/5G. For example, the first wireless communication manner may be a Wi-Fi communication manner, and the second wireless communication manner may be a 4G long term evolution (long term evolution, LTE) communication manner or a 5G non-standalone/standalone (non-standalone/standalone, NSA/SA) communication manner. It should be noted that, if the first wireless communication manner is the Wi-Fi communication manner, the mobile routing device may also be referred to as accompanying Wi-Fi or mobile Wi-Fi (mobile Wi-Fi, Wi-Fi).

The mobile device in this embodiment of this disclosure includes but is not limited to a smartphone, a smart headset, a tablet computer, a wearable device (such as a smart watch, a smart band, a smart ring, or smart glasses) with a wireless communication function, a vehicle-mounted device, an augmented reality (augmented reality, AR)/virtual reality (virtual reality, VR) device, a personal digital assistant (personal digital assistant, PDA), or the like. An example embodiment of the mobile device includes but is not limited to a portable wireless routing device using iOS®, Android®, Microsoft®, Windows, Linux, or another operating system. The foregoing mobile device may alternatively be another portable device such as a laptop computer (Laptop). It should be further understood that, in some other embodiments, the foregoing mobile device may not be a portable device, but may be a desktop computer, and the like.

The mobile routing device in this embodiment of this disclosure includes a wireless mobile router, or also includes another mobile device that functions a wireless router, for example, a mobile device that can enable a wireless hotspot function, and in this case, the mobile device is a mobile routing device. In addition, the mobile routing device may be mobile wireless customer premise equipment (customer premise equipment, CPE), a mobile wireless access point, or the like. It should be noted that the mobile routing device is powered by a battery during use of the mobile routing device.

Because the mobile routing device is powered by a battery without an external power supply during use, running duration of the mobile routing device is limited by battery power. In some scenarios in which the mobile routing device is used, for example, in a scenario in which a tour group provides a free Internet access service for passengers during travel through the mobile routing device, running duration of the mobile routing device is limited, and therefore a long-term free Internet access service may not be provided for the passengers in the tour group. Therefore, how to prolong the running duration of the mobile routing device without affecting a normal service becomes our requirement.

Figure 2:
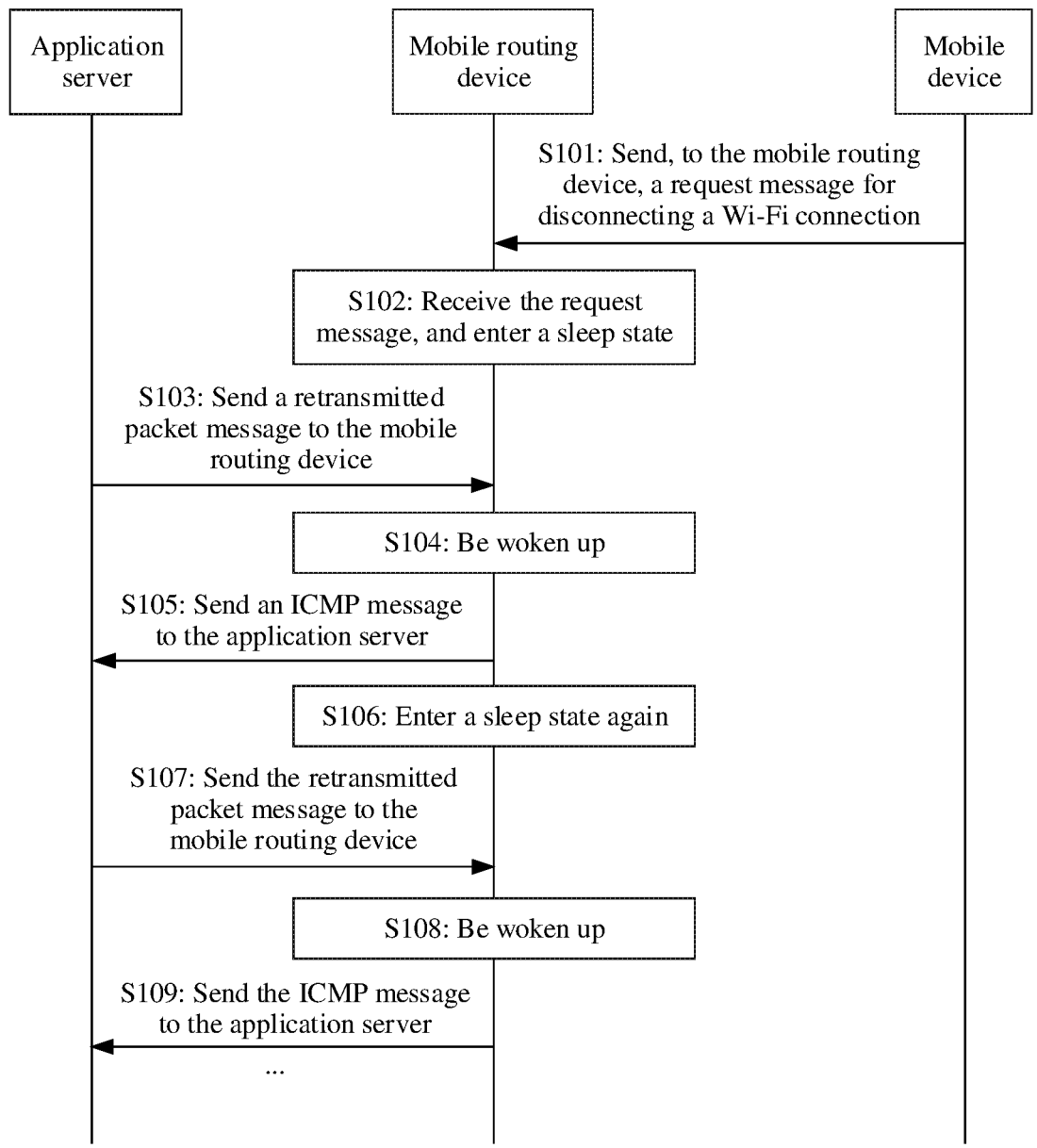
FIG. 2 is a flowchart of a sleep method for a mobile routing device.

In the scenario shown in FIG. 1, after long-term and arduous research and analysis, the inventor concludes that the mobile routing device is frequently woken up after entering a sleep state. With reference to FIG. 2, a sleep and wake-up process of the mobile routing device is described by using an example in which a mobile device disconnects a Wi-Fi connection between the mobile device and the mobile routing device to enable the mobile routing device to enter a sleep state. For ease of description, there is one mobile device, one mobile routing device, and one application server in FIG. 2.

As shown in FIG. 2, the mobile device sends, to the mobile routing device, a request message for disconnecting a Wi-Fi connection (S101). After receiving the request message, the mobile routing device determines that no mobile device is currently connected, and enters a sleep state (S102). Then, if the application server attempts to communicate with the mobile device, the application server sends a retransmitted packet message to the mobile routing device (S103), to communicate with the mobile device through the mobile routing device. The mobile routing device is woken up from the sleep state after receiving the retransmitted packet message (S104). The mobile device cannot communicate with the mobile routing device because of a Wi-Fi disconnection between the mobile device and the mobile routing device, and therefore the retransmitted packet message cannot reach the mobile device through the mobile routing device, and the mobile routing device cannot obtain a reply from the mobile device. In this case, the mobile routing device sends an internet control message protocol (internet control message protocol, ICMP) message (S105) to the application server, to notify the application server that the retransmitted packet message cannot be transmitted to the mobile device, that is, the mobile device is unreachable. Then, the mobile routing device enters a sleep state again (S106). If the application server attempts to communicate with the mobile device again later, the application server further sends the retransmitted packet message to the mobile routing device, the mobile routing device is woken up again and sends the ICMP message to the application server (S107 to S109), and then the mobile routing device enters a sleep state again. This process repeats.

The ICMP is a sub-protocol of a TCP/IP suite, and is used to transmit messages indicating whether a network is connected, whether a destination address is reachable, whether a routing device is available, or the like. It should be noted that these messages are not used for transmitting data.

That is, in the case shown in FIG. 2, the mobile routing device is frequently woken up after entering a sleep state. This leads to relatively high power consumption and insufficient battery power of the mobile routing device, and consequently relatively long running duration cannot be implemented.

To resolve the foregoing technical problem, this disclosure provides a sleep control method for a mobile routing device and a mobile routing device, to reduce power consumption of the mobile routing device by optimizing and controlling sleep of the mobile routing device, so that standby duration is prolonged, and running duration of the mobile routing device is prolonged.

Figure 3:
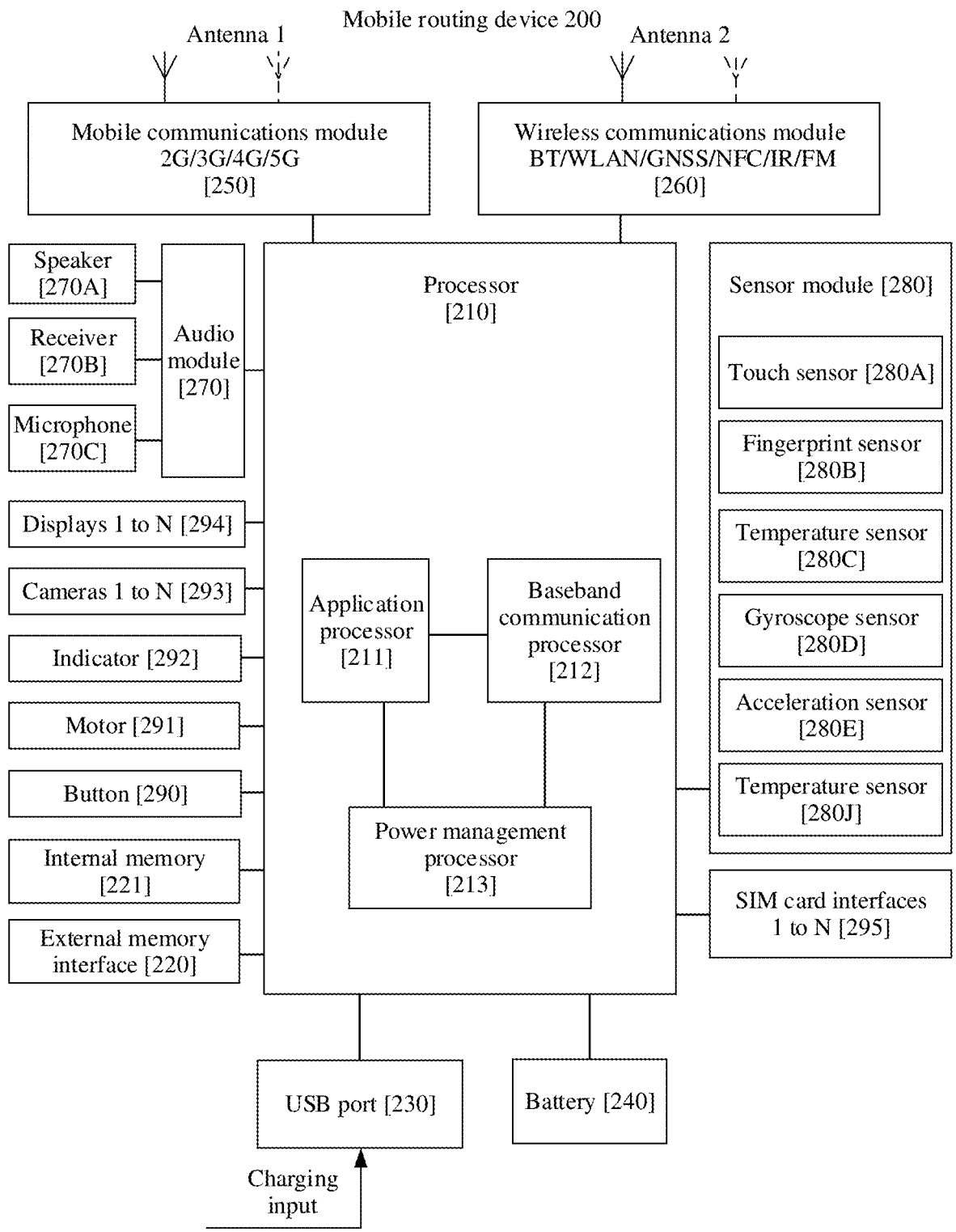
FIG. 3 is a schematic diagram of a hardware structure of a mobile routing device according to an embodiment of this disclosure.

For example, FIG. 3 is a schematic diagram of a hardware structure of a mobile routing device according to an embodiment of this disclosure. As shown in FIG. 3, the mobile routing device 200 may include a processor 210, an external memory interface 220, an internal memory 221, a universal serial bus (universal serial bus, USB) port 230, a battery 240, an antenna 1, an antenna 2, a mobile communications module 250, a wireless communications module 260, an audio module 270, a speaker 270A, a receiver 270B, a microphone 270C, a sensor module 280, a button 290, a motor 291, an indicator 292, a camera 293, a display 294, a subscriber identity module (subscriber identity module, SIM) card interface 295, and the like.

It can be understood that, the structure shown in this embodiment of this disclosure does not constitute a specific limitation on the mobile routing device 200. In some other embodiments of this disclosure, the mobile routing device 200 may include more or fewer components than those shown in the figure, or some components may be combined, or some components may be split, or different component arrangements may be used. The components shown in the figure may be implemented by hardware, software, or a combination of software and hardware.

The processor 210 may include one or more processing units. For example, the processor 210 may include at least one of an application processor (application processor, AP) 211, a baseband communication processor 212, and a power management processor 213. Optionally, the processor 210 may further include at least one of a graphics processing unit (graphics processing unit, GPU), an image signal processor (image signal processor, ISP), a controller, a video codec, a digital signal processor (digital signal processor, DSP), a neural-network processing unit (neural-network processing unit, NPU), and the like. Different processing units may be independent components, or may be integrated into one or more processors.

The application processor 211 (also referred to as an AP core 211) is configured to process an application service. For example, the application processor 211 receives an application service request message sent by the mobile device, processes the application service request message, and sends processed data to the baseband communication processor 212 after processing; and the application processor 211 receives a response message of the baseband communication processor 212, processes the response message, and sends processed data to the mobile device after processing. For example, the application processor 211 may perform a service such as Wi-Fi control. In addition, the application processor 211 may further control a sleep logic. In the control of the sleep logic, when a service module controlled by the application processor 211 holds a sleep lock, it indicates that there is service processing, and the service module prevents a system from entering a sleep state; or when all service modules release sleep locks (that is, hold no sleep lock), it indicates that the mobile routing device 200 may enter a sleep state, and then the application processor 211 immediately enters a sleep state.

A short-distance wireless communication function of the mobile routing device 200 may be implemented by using the antenna 2, the wireless communications module 260, the application processor 211, and the like.

The baseband communication processor 212 (also referred to as a modem core) is configured to process a mobile communication service between the baseband communication processor 212 and the application server. Specifically, the baseband communication processor 212 may perform mobile communication with the application server by using a cellular network. For example, the baseband communication processor 212 receives the data processed by the application processor 211 or the response message of the application server, and separately sends the processed data or the processed response message to the application server or the application processor 211. A cellular communication function of the mobile routing device 200 may be implemented by using the antenna 1, the mobile communications module 250, the baseband communication processor 212, and the like. In some embodiments, the baseband communication processor may be an independent component. In some other embodiments, the baseband communication processor may be independent of the processor 210, and is disposed in a same device as the mobile communications module 250 or another function module.

In an implementation, the baseband communication processor 212 may include a modem. The modem may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband communication processor for processing. The low-frequency baseband signal is processed by the baseband communication processor and then transmitted to the application processor.

The power management processor 213 (also referred to as a power management core) is configured to manage power consumption of the mobile routing device 200, and is a main control core processing unit of the mobile routing device 200. Specifically, the power management processor 213 may receive an indication from the application processor 211 and/or the baseband communication processor 212, and control power consumption of some or all components of the mobile routing device 200 based on the indication. For example, when the mobile routing device is in a sleep state, the power management processor 213 reduces power consumption of some components, to reduce power consumption of the mobile routing device and prolong running duration. The power management processor 213 may receive a charging input from a charger by using the USB port 230. The power management processor 213 is configured to connect to the battery 240, the application processor 211, and the baseband communication processor 212. In an implementation, the power management processor 213 may specifically use a Cortex-M3 processor (also referred to as an M3 core). After both the application processor 211 and the baseband communication processor 212 enter sleep states, the power management processor 213 controls the mobile routing device 200 to enter a low power consumption mode, that is, a sleep state.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB port 230 is a port that conforms to a USB standard specification, and may be specifically a mini USB port, a micro USB port, a USB Type-C port, or the like. It may be understood that, the interface connection relationship between the modules illustrated in this embodiment of this disclosure is merely an example for description, and does not constitute a limitation on the structure of the mobile routing device 200. In some other embodiments of this disclosure, the mobile routing device 200 may alternatively use an interface connection manner different from that in the foregoing embodiment, or use a combination of a plurality of interface connection manners.

The antenna 1 and the antenna 2 are configured to transmit and receive an electromagnetic wave signal. Each antenna in the mobile routing device 200 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 250 may provide a solution, applied to the mobile routing device 200, to wireless communication including 2G/3G/4G/5G or the like. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering or amplification on the received electromagnetic wave, and transmit the electromagnetic wave to the baseband communication processor for demodulation. The mobile communications module 250 may further amplify a signal modulated by the baseband communication processor, and convert the signal into an electromagnetic wave for radiation through the antenna 1. In some embodiments, at least some function modules in the mobile communications module 250 may be disposed in the processor 210. In some embodiments, at least some function modules in the mobile communications module 250 may be disposed in a same component as at least some modules in the processor 210.

The wireless communications module 260 may provide a solution, applied to the mobile routing device 200, to wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 260 may be one or more components integrating at least one communications processing module. The wireless communications module 260 receives an electromagnetic wave through the antenna 2, performs frequency modulation and filtering processing on an electromagnetic wave signal, and sends a processed signal to the application processor 211 in the processor 210. The wireless communications module 260 may further receive a to-be-sent signal from the application processor 211, perform frequency modulation and amplification on the signal, and convert the signal into an electromagnetic wave for radiation through the antenna 2.

In some embodiments, in the mobile routing device 200, the antenna 1 and the mobile communications module 250 are coupled, and the antenna 2 and the wireless communications module 260 are coupled, so that the mobile routing device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The external memory interface 220 may be used to connect to an external memory, to extend a storage capability of the mobile routing device 200. The external memory includes but is not limited to an external memory card, a hard disk, or a USB flash drive. The external memory card may be specifically a Micro SD card. The external memory card communicates with the processor 210 through the external memory interface 220, to implement a data storage function.

The internal memory 221 includes but is not limited to a flash memory FLASH, or a double data rate synchronous dynamic random access memory (double data rate, DDR).

In an implementation, the mobile routing device 200 may further include a charging and discharging integrated circuit (integrated circuit, IC).

Figure 4:
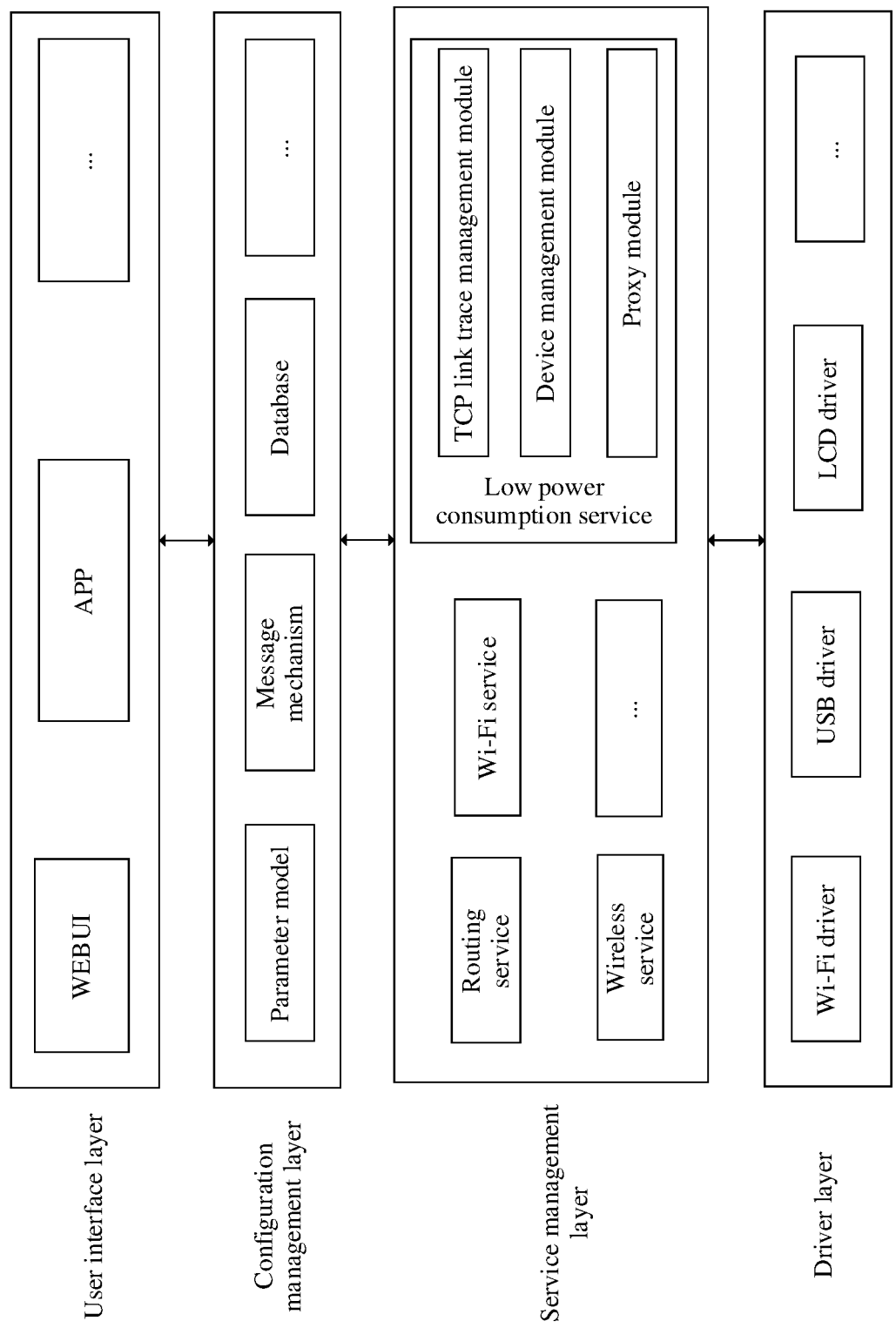
FIG. 4 is a schematic diagram of a software architecture of an application processor on a mobile routing device according to an embodiment of this disclosure.

For example, FIG. 4 is a schematic diagram of a software architecture of an application processor on a mobile routing device according to an embodiment of this disclosure. As shown in FIG. 4, the software architecture run on the application processor 211 on the mobile routing device 200 includes a user interface layer, a configuration management layer, a service management layer, and a driver layer.

The user interface layer includes a WEBUI and an APP. The WEBUI is used to provide a user with an interface for interacting with the mobile routing device. For example, the user may choose to set a Wi-Fi name by using the WEBUI.

The configuration management layer is configured to perform a configuration operation, for example, modifying a Wi-Fi name or password, on the mobile routing device based on a configuration instruction received from the WEBUI.

The service management layer is configured to receive information sent by the configuration management layer, to manage various services in the mobile routing device. The services managed by the service management layer include a routing service, a Wi-Fi service, a wireless service, and a low power consumption service, and the like. The low power consumption service may include: a TCP link trace management module, a device management module, and a proxy module.

The TCP link trace management module may be configured to record TCP link information of mobile devices on all local area networks (local area networks, LAN). In addition, the TCP link trace management module can further provide an interface for querying, deleting, or adding the TCP link information.

The device management module may be configured to manage mobile devices accessed on the LANs. For example, the mobile routing device may process an event by using the device management module, for example, a mobile device accesses or is disconnected from a local area network.

The proxy module may be configured to act as a proxy for the mobile device to send a disconnection message such as a TCP reset packet or a TCP FIN packet to the application server, to disconnect a transmission link such as a TCP link between the mobile device and the application server.

Figure 5:
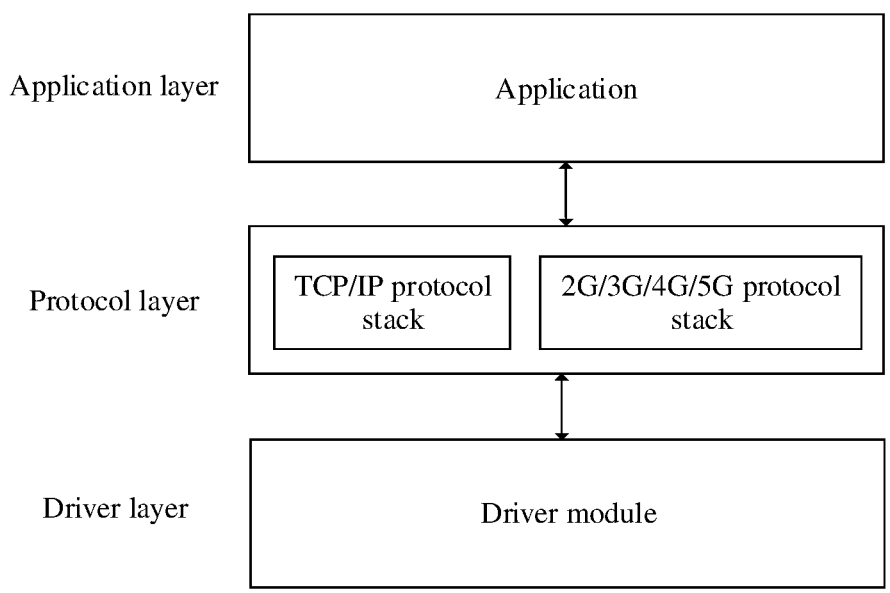
FIG. 5 is a schematic diagram of a software architecture of a baseband communication processor on a mobile routing device according to an embodiment of this disclosure.

For example, FIG. 5 is a schematic diagram of a software architecture of a baseband communication processor on a mobile routing device according to an embodiment of this disclosure. As shown in FIG. 5, the software architecture run on the baseband communication processor 212 on the mobile routing device 200 includes an application layer, a protocol layer, and a driver layer. The application layer includes an application. The protocol layer includes a transmission control protocol/internet protocol (transmission control protocol/internet protocol, TCP/IP) protocol stack and a 2G/3G/4G/5G protocol stack. The driver layer includes a driver module. The baseband communication processor 212 may perform query and configuration management by using an AT (Attention) command (that is, a modulation and demodulation command language), for example, triggering network search, querying a network speed, and querying signal strength in a cell. When the baseband communication processor 212 does not perform air interface transmission, that is, when no data packet is transmitted between the baseband communication processor 212 and a base station of a cellular network, the baseband communication processor 212 enters a sleep state.

It may be understood that longer duration in the low power consumption mode for mobile routing device indicates lower power consumption of the mobile routing device, so that standby duration is prolonged.

Figure 6:
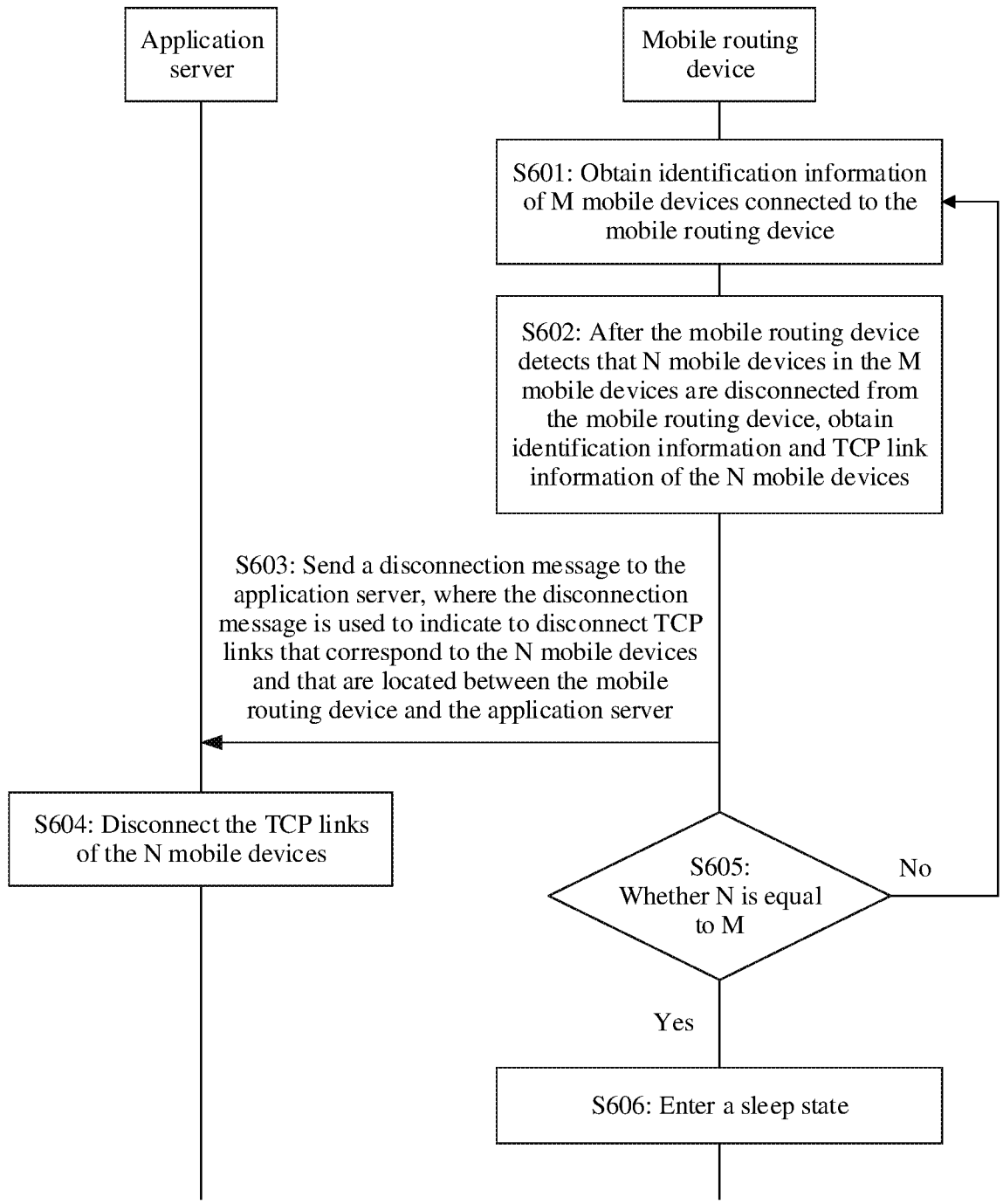
FIG. 6 is a flowchart of a sleep control method for a mobile routing device according to an embodiment of this disclosure.

The following describes a sleep control method for a mobile routing device provided in an embodiment of this disclosure by using an example in which the mobile routing device communicates with mobile devices through Wi-Fi. As shown in FIG. 6, the sleep control method for the mobile routing device provided in this embodiment of this disclosure includes the following steps.

S601: The mobile routing device obtains identification information of M mobile devices connected to the mobile routing device.

If the M mobile devices are currently connected to the mobile routing device, it indicates that the mobile routing device needs to provide network services for the M mobile devices. Further, the mobile routing device obtains the identification information of the M connected mobile devices. M is a positive integer greater than or equal to 1.

In some embodiments, the identification information of the mobile device is used to identify or confirm the mobile device. For example, the identification information of the mobile device may be an identity document (identity document, ID) or a media access control (media access control, MAC) address of the mobile device. A specific type of the identification information is not limited in this disclosure.

In some embodiments, when performing S601, the mobile routing device collects statistics on a total quantity M of currently connected mobile devices, and obtains the identification information of the M mobile devices.

In some embodiments, the mobile routing device may obtain the identification information of the M connected mobile devices after a triggering event occurs. For example, the triggering event may be that the mobile routing device is connected to or disconnected from a mobile device. Each time the mobile routing device is connected to a mobile device, the mobile routing device may collect statistics on a total quantity M of currently connected mobile devices. Specifically, if the mobile routing device is connected to a mobile device each time, the mobile routing device may obtain identification information of the mobile device, and add 1 to the total quantity of currently connected mobile devices. If the mobile routing device is disconnected from a mobile device each time, the mobile routing device may delete identification information of the mobile device, and subtract 1 from the total quantity of currently connected mobile devices. After connected to the M mobile devices, the mobile routing device may obtain the identification information of the M mobile devices.

In some other embodiments, the mobile routing device may periodically collect statistics on a total quantity M of currently connected mobile devices, and obtain the identification information of the M mobile devices.

Optionally, in some embodiments, the mobile routing device may further obtain TCP link information of each of the M connected mobile devices. If the mobile devices connected to the mobile routing device request corresponding services or data from the application server, TCP links may be established between the mobile devices and the application server by using a "three-way handshake" (three-way handshake, RFC:793 Transmission Control Protocol Darpa Internet Program Protocol Specification) protocol stipulated in a TCP protocol. In some embodiments, after the TCP links are established between the mobile devices and the application server through the mobile routing device, the mobile routing device may further obtain TCP link information of each mobile device. In some embodiments, when performing S601, the mobile routing device obtains TCP link information of each of the M mobile devices.

In some embodiments, the TCP link information may be identification information of a TCP link. For example, the identification information may be a 5-tuple, and the 5-tuple includes a source IP address, a source MAC address, a destination IP address, a destination MAC address, and a destination port. Because the 5-tuple corresponds to a unique TCP link, one TCP link can be uniquely determined based on one 5-tuple. That is, the identification information is used to uniquely identify one TCP link.

In some embodiments, the mobile routing device may record the TCP link information in a TCP service trace record table. Time at which the mobile routing device records the TCP link information is not limited in this embodiment of this disclosure. For example, the mobile routing device may record the TCP link information after the TCP links are established between the mobile devices and the application server. For another example, the mobile routing device may record the TCP link information when the TCP links are established between the mobile devices and the application server.

In some embodiments, the mobile routing device records the TCP link information, which is performed by the TCP link trace management module.

It may be understood that there may be one or more application servers in this embodiment of this disclosure. A plurality of mobile devices may request services from a same application server; one mobile device may request different services from a plurality of application servers; or a plurality of mobile devices may request different services from a plurality of application servers. This is not limited in this disclosure.

S602: After detecting that N mobile devices in the M mobile devices are disconnected from the mobile routing device, the mobile routing device obtains identification information and TCP link information of the N mobile devices.

N is a positive integer greater than or equal to 1 and less than or equal to M.

In some embodiments, when detecting that one of the M connected mobile devices disconnects a Wi-Fi connection, the mobile routing device may obtain identification information of the mobile device, and determine, based on the identification information of the mobile device, TCP link information corresponding to the mobile device. That is, in this case, N is equal to 1.

In some embodiments, the mobile routing device may also periodically collect statistics on a quantity N of mobile devices that currently disconnect Wi-Fi connections between the mobile devices and the mobile routing device, obtain identification information of each of the N mobile devices, and determine corresponding TCP link information based on the identification information of the N mobile devices.

It may be understood that, when Wi-Fi connections between the N mobile devices and the mobile routing device are suddenly disconnected, some TCP links between the N mobile devices and a corresponding application server may not be normally disconnected in time, for example, may not be normally disconnected in a manner such as "four-way handshake" (four-way handshake, RFC:793 Transmission Control Protocol Darpa Internet Program Protocol Specification) stipulated in the TCP protocol. In this case, the TCP links between the N mobile devices and the corresponding application servers may be reserved. The TCP link information of the N mobile devices in step S602 is information about the TCP links reserved herein.

In some embodiments, the mobile routing device detects, by using the device management module, that the mobile devices disconnect Wi-Fi connections between the mobile device and the mobile routing device, and the device management module sends, to the proxy module, a message indicating that the mobile devices disconnect the Wi-Fi connections between the mobile device and the mobile routing device.

In some embodiments, the mobile routing device obtains the identification information of the N mobile devices, which is performed by the proxy module. After obtaining the identification information of the N mobile devices, the proxy module records the identification information in a proxy list of the mobile routing device. The proxy list is stored in the proxy module.

That is, the proxy list of the mobile routing device may record identification information of the mobile devices that have disconnected Wi-Fi connections between the mobile device and the mobile routing device. For example, the identification information may be an ID or an MAC address of a mobile device. The mobile routing device can uniquely confirm a corresponding mobile device based on the identification information, and then the mobile routing device can act as a proxy for the mobile device to send a disconnection message to the application server, to disconnect a TCP link between the mobile device and the application server.

In some embodiments, the mobile routing device may traverse the TCP service trace record table by using the proxy module, and determine, based on the identification information of the N mobile devices, whether the TCP service trace record table records the TCP link information of the N mobile devices. If the TCP link information of the N mobile devices is recorded, the mobile routing device may alternatively obtain the TCP link information of the N mobile devices by using the proxy module.

S603: The mobile routing device sends a disconnection message to the application server, where the disconnection message is used to indicate to disconnect TCP links that correspond to the N mobile devices and that are located between the mobile routing device and the application server.

After obtaining the identification information and the TCP link information of the N mobile devices that disconnect the Wi-Fi connections, the mobile routing device determines, based on the TCP link information, one or more application servers that establish TCP link connections with the N mobile devices, and acts as a proxy for the N mobile devices to send disconnection messages to the one or more application servers. The disconnection messages are used to indicate to disconnect the TCP links that correspond to the N mobile devices and that are located between the mobile routing device and the application servers. For example, the disconnection message may include a TCP reset packet, a TCP FIN packet, or the like. A specific form of the disconnection message is not limited in this embodiment of this disclosure. In this way, the mobile routing device receives no communication message sent from the application server on the TCP links corresponding to the N mobile devices, to reduce possibility that the mobile routing device is frequently woken up after entering a sleep state, and even avoid being frequently woken up, so that running duration is prolonged. In addition, the application server sends no communication message by using the TCP links of the N mobile devices, so that power consumption of the application servers can be reduced.

In some embodiments, the disconnection message may be a message including a TCP reset packet or a TCP FIN (finish) packet; the disconnection message may be a set of a plurality of TCP reset packets or a plurality of TCP FIN packets; or the disconnection message may be a specific message.

Specific descriptions are provided with reference to the scenario in FIG. 1. For example, a TCP link 1 is established between the mobile device 101 and the application server 301 through the mobile routing device 200. After the mobile device 101 is disconnected from the mobile routing device 200, the TCP link 1 that corresponds to the mobile device 101 and that is located between the mobile routing device 200 and the application server 301 needs to be disconnected, and the disconnection message may be a TCP reset packet sent by the mobile routing device 200 to the application server 301. After receiving the TCP reset packet, the application server 301 disconnects the TCP link 1 that corresponds to the mobile device 101 and that is located between the mobile routing device 200 and the application server 301.

For example, a TCP link 1 and a TCP link 2 are established between the mobile device 101 and the application server 301 through the mobile routing device 200. After the mobile device 101 is disconnected from the mobile routing device 200, the TCP link 1 and the TCP link 2 that correspond to the mobile device 101 and that are located between the mobile routing device 200 and the application server 301 need to be disconnected, and the mobile routing device 200 sends a disconnection message to the application server 301. In this case, the disconnection message includes a TCP reset packet 1 and a TCP reset packet 2, in other words, the disconnection message is a set of two TCP reset packets.

In some embodiments, when the mobile routing device detects that one of the M connected mobile devices disconnects a Wi-Fi connection, that is, N is equal to 1, the mobile routing device obtains identification information and TCP link information of the mobile device, and then acts as a proxy for the mobile device to send a disconnection message to a corresponding application server. That is, the mobile routing device acts as a proxy for the mobile device to disconnect a TCP link that corresponds to the mobile device and that is located between the mobile routing device and the application server. In short, the mobile routing device acts as a proxy for the mobile device to disconnect all TCP links between the mobile device and the corresponding application server.

In some other embodiments, the mobile routing device periodically collects statistics on a quantity N of mobile devices that currently disconnect Wi-Fi connections between the mobile device and the mobile routing device, and after obtaining identification information and TCP link information of the N mobile devices that disconnect Wi-Fi connections between the mobile device and the mobile routing device, acts as a proxy for the N mobile devices to send disconnection messages to corresponding application servers. That is, the mobile routing device acts as a proxy for the N mobile devices to disconnect all TCP links between the N mobile devices and the corresponding application servers. N herein is a positive integer greater than or equal to 1 and less than or equal to M.

In some embodiments, for a plurality of TCP links corresponding to the N mobile devices, the mobile routing device may send, for each TCP link, a message including a TCP reset packet or a TCP FIN packet, that is, the disconnection message may include a plurality of messages including TCP reset packets or TCP FIN packets.

In some other embodiments, for a plurality of application servers that have TCP links between the application servers and N mobile devices, the mobile routing device may send a disconnection messages to each application server. The disconnection message is used to indicate to disconnect TCP links that correspond to the N mobile devices and that are located between the mobile routing device and the application server.

In some embodiments, the mobile routing device sends the disconnection message to the application server, which is performed by the proxy module.

It may be understood that, after the mobile routing device sends the disconnection message to the application server to disconnect a TCP link, the mobile routing device does not need information about the TCP link. Optionally, to save storage space, the mobile routing device may also delete the information about the TCP link from the TCP service trace record table by using the proxy module.

S604: The application server disconnects the TCP links of the N mobile devices.

After receiving the disconnection message sent by the mobile routing device acting as a proxy for the N mobile devices, the application server disconnects corresponding TCP links. In this way, the application server sends no communication message to the N mobile devices through the mobile routing device by using the TCP links of the N mobile devices. In other words, the mobile routing device receives, by using the TCP links of the N mobile devices, no communication message sent by the application server.

S605: The mobile routing device detects whether N is equal to M. After detecting that N is equal to M, the mobile routing device performs S606; or after detecting that N is not equal to M, the mobile routing device returns to perform S601, and then sequentially performs S602 to S605.

S606: The mobile routing device enters a sleep state.

After the mobile routing device detects that N is equal to M, it indicates that TCP links between the current application server and all mobile devices previously connected to the mobile routing device are all disconnected. Therefore, the mobile routing device is not frequently woken up by the message sent by the application server. In this way, the mobile routing device stably enters a sleep state (S606), so that power consumption of the mobile routing device is reduced, and standby duration of the mobile routing device is prolonged.

After detecting that N is not equal to M, the mobile routing device performs iterative update on a quantity M of currently connected mobile devices, and subtracts the N disconnected mobile devices. Further, a quantity of newly connected mobile devices may be added. Then, the mobile routing device continues to perform S601, that is, obtain identification information of M currently connected mobile devices, and then continues to perform subsequent S602 to S605, and even S606. That is, the mobile routing device performs iterative update on the quantity M of connected mobile devices until all mobile devices connected to the mobile routing device are disconnected from the mobile routing device, and the mobile routing device acts as a proxy for all the mobile devices to send the disconnection message to the application server. After TCP links between all the mobile devices and the application server are disconnected, the mobile routing device stably enters a sleep state. In this case, because TCP links between the application server and the mobile devices are all disconnected, the application server sends no message to the mobile devices through the mobile routing device. Correspondingly, the mobile routing device is not frequently woken up by the message sent by the application server.

In some embodiments, the mobile routing device may further prompt, in a plurality of manners such as a voice, screen display, or a vibration, the user that the mobile routing device has entered a sleep state, or the mobile routing device has been woken up.

In some embodiments, the mobile routing device is powered only by a battery. In some embodiments, the mobile routing device may alternatively be powered by a direct current power supply or an alternating current power supply. However, during actual use of the mobile routing device, the mobile routing device is powered only by a battery.

An embodiment of this disclosure provides a proxy wake-up control method for a mobile routing device. According to the method, the mobile routing device acts as a proxy for a mobile device that disconnects a Wi-Fi connection between the mobile device and the mobile routing device to send a disconnection message to an application server to disconnect a TCP link established between the mobile device and the application server through the mobile routing device. After all the mobile devices connected to the mobile routing device disconnect Wi-Fi connections between the mobile device and the mobile routing device, that is, in a scenario in which the mobile routing device is not connected, the mobile routing device acts as a proxy for all the mobile devices to send disconnection messages to corresponding application servers, to disconnect all TCP links between all the mobile devices and the corresponding application servers. Because the TCP links between the application server and all the mobile devices are all disconnected, the application server sends no message to the mobile devices through the mobile routing device by using the TCP links. Correspondingly, the mobile routing device is not frequently woken up by the communication message sent by the application server. In this way, the mobile routing device can stably enter a sleep state, so that batter power is saved, power consumption is reduced, and standby duration is prolonged.

In step S602, each of the N mobile devices may disconnect the Wi-Fi connection between the mobile device and the mobile routing device in many cases, and therefore the mobile routing device can detect, in many cases, that the mobile device disconnects the Wi-Fi connection between the mobile device and the mobile routing device.

Figure 7:
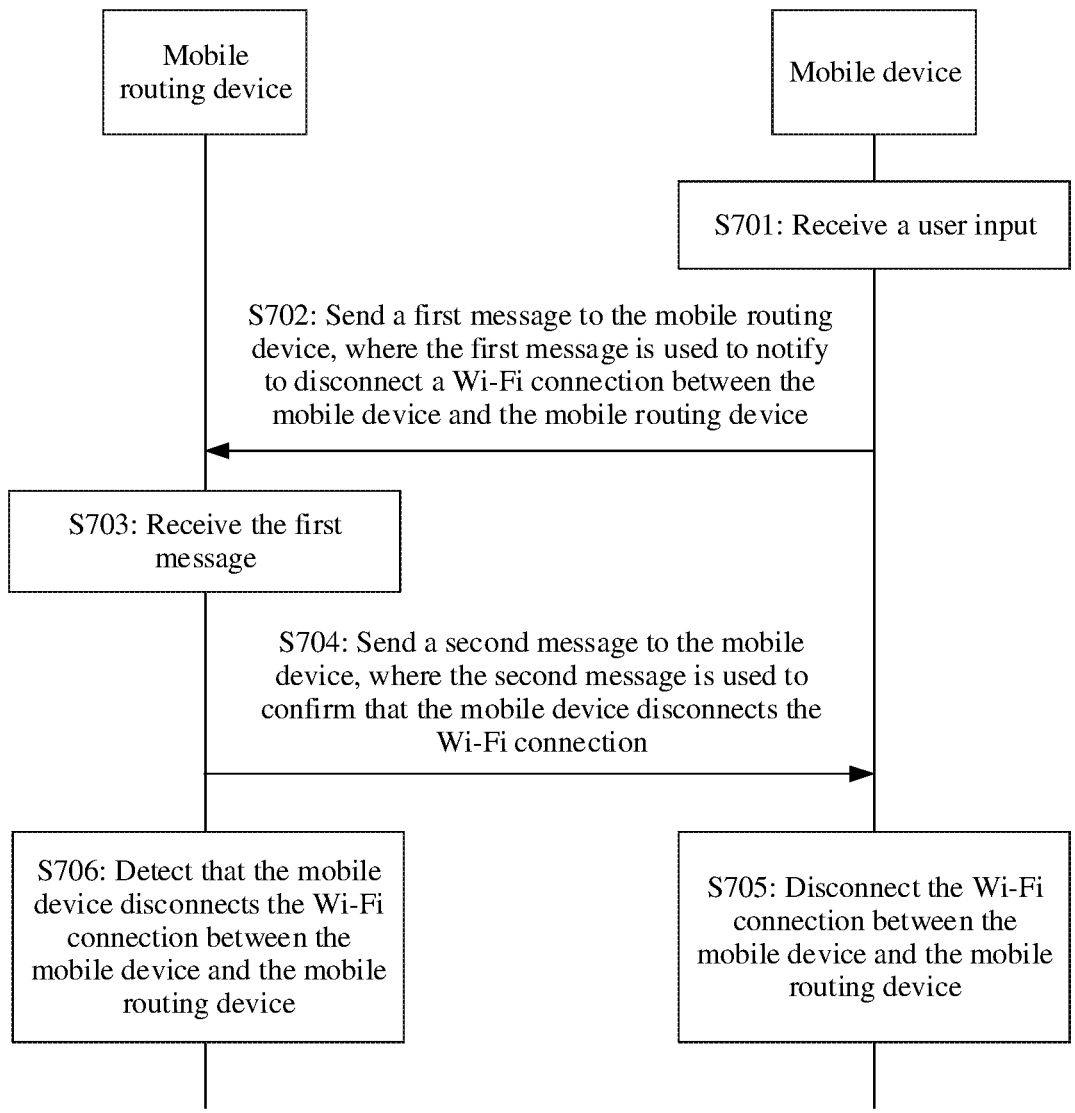
FIG. 7 is a flowchart in which a mobile routing device detects that a mobile device is disconnected from the mobile routing device according to an embodiment of this disclosure.

FIG. 7 is a flowchart in which a mobile routing device detects that a mobile device disconnects a Wi-Fi connection between the mobile device and the mobile routing device according to an embodiment of this disclosure. For example, as shown in FIG. 7, the mobile device may actively disconnect the Wi-Fi connection between the mobile device and the mobile routing device in response to a user input. The process includes the following steps.

S701. The mobile device receives a user input.

The user input may be an operation of disabling Wi-Fi by a user. For example, the user input may be an operation of manually disabling a Wi-Fi connection option by the user, or the user input may be a voice input of disabling Wi-Fi by the user.

S702: The mobile device sends a first message to the mobile routing device, where the first message is used to notify to disconnect a Wi-Fi connection between the mobile device and the mobile routing device.

For example, the first message includes an identifier of the mobile device and content indicating that the mobile device disconnects the Wi-Fi connection between the mobile device and the mobile routing device.

In some embodiments, the first message may be a disassociation message.

After receiving the operation of disabling Wi-Fi by the user, the mobile device sends the identifier of the mobile device and the content indicating that the mobile device disconnects the Wi-Fi connection with the mobile routing device. The identifier of the mobile device is used by the mobile routing device to identify the mobile device that requests to disconnect the Wi-Fi connection, and the content is used to notify that the mobile routing device disconnects the Wi-Fi connection between the mobile device corresponding to identifier information and the mobile routing device.

S703: The mobile routing device receives the first message.

After receiving the first message, the mobile routing device determines, based on the identifier of the mobile device and the content indicating that the mobile device disconnects the Wi-Fi connection between the mobile device and the mobile routing device, to disconnect the Wi-Fi connection between the mobile device and the mobile routing device.

S704: The mobile routing device sends a second message to the mobile device, where the second message is used to confirm that the mobile device disconnects the Wi-Fi connection.

The second message is a confirmation message for the mobile routing device to confirm that the mobile device disconnects the Wi-Fi connection. After confirming that the Wi-Fi connection between the mobile device and the mobile routing device is disconnected, the mobile routing device sends, to the mobile device, the confirmation message of disconnecting the Wi-Fi connection, and therefore the mobile device disconnects the Wi-Fi connection between the mobile device and the mobile routing device.

S705: The mobile device disconnects the Wi-Fi connection between the mobile device and the mobile routing device.

After receiving the second message sent by the mobile routing device, the mobile device disconnects the Wi-Fi connection between the mobile device and the mobile routing device.

S706: The mobile routing device detects that the mobile device disconnects the Wi-Fi connection between the mobile device and the mobile routing device.

Optionally, S706 may be performed before S704. In this way, S706 is performed first, and then S704 and S705 are performed.

Figure 8:
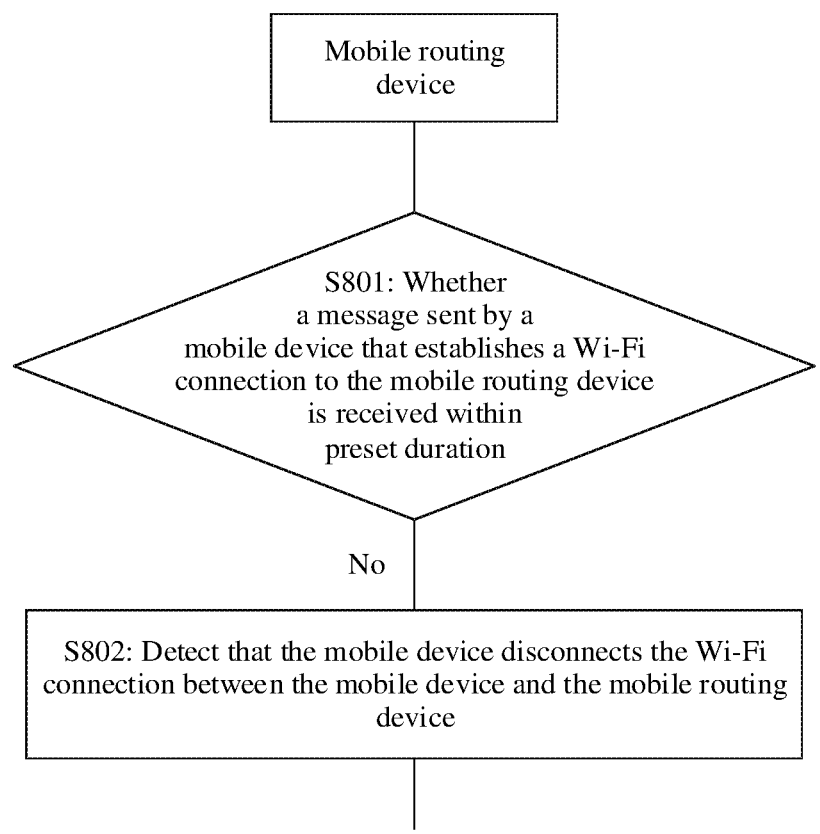
FIG. 8 is another flowchart in which a mobile routing device detects that a mobile device is disconnected from the mobile routing device according to an embodiment of this disclosure.

FIG. 8 is another flowchart in which a mobile routing device detects that a mobile device disconnects a Wi-Fi connection between the mobile device and the mobile routing device according to an embodiment of this disclosure. For example, as shown in FIG. 8, the mobile device may disconnect the Wi-Fi connection between the mobile device and the mobile routing device in an active or a passive manner. The process includes the following steps.

S801: The mobile routing device determines whether a message sent by the mobile device that establishes a Wi-Fi connection to the mobile routing device is received within preset duration.

The preset duration herein may be 1 minute, 2 minutes, 5 minutes, or the like. The preset duration is not limited in this embodiment of this disclosure.

In some embodiments, the message may be a keepalive message. The keepalive message is sent by a bottom-level system of the mobile device, and is used to indicate that the mobile device does not disconnect the Wi-Fi connection between the mobile device and the mobile routing device although no data is transmitted between the mobile device and the application server through the mobile routing device. In other words, the keepalive message is used to indicate that the mobile device still keeps the Wi-Fi connection to the mobile routing device.

S802: The mobile routing device detects that the mobile device disconnects a Wi-Fi connection between the mobile device and the mobile routing device after no message sent by the mobile device is received within the preset duration.

If the mobile routing device receives no message sent by the mobile device within the preset duration, it indicates that the Wi-Fi connection between the mobile device and the mobile routing device is disconnected. For example, interference may occur on the Wi-Fi connection, or shielding may occur around the mobile device. Because the Wi-Fi connection between the mobile device and the mobile routing device is disconnected, the mobile routing device detects that the mobile device disconnects the Wi-Fi connection between the mobile device and the mobile routing device.

In addition, because the mobile device may move too far and leave a signal coverage area of the mobile routing device, the mobile device may disconnect the Wi-Fi connection between the mobile device and the mobile routing device. It may be understood that the mobile routing device may alternatively detect, in another case, that the mobile device disconnects the Wi-Fi connection between the mobile device and the mobile routing device. A scenario in which the mobile device disconnects the Wi-Fi connection is not limited in this embodiment of this disclosure.

Figure 9:
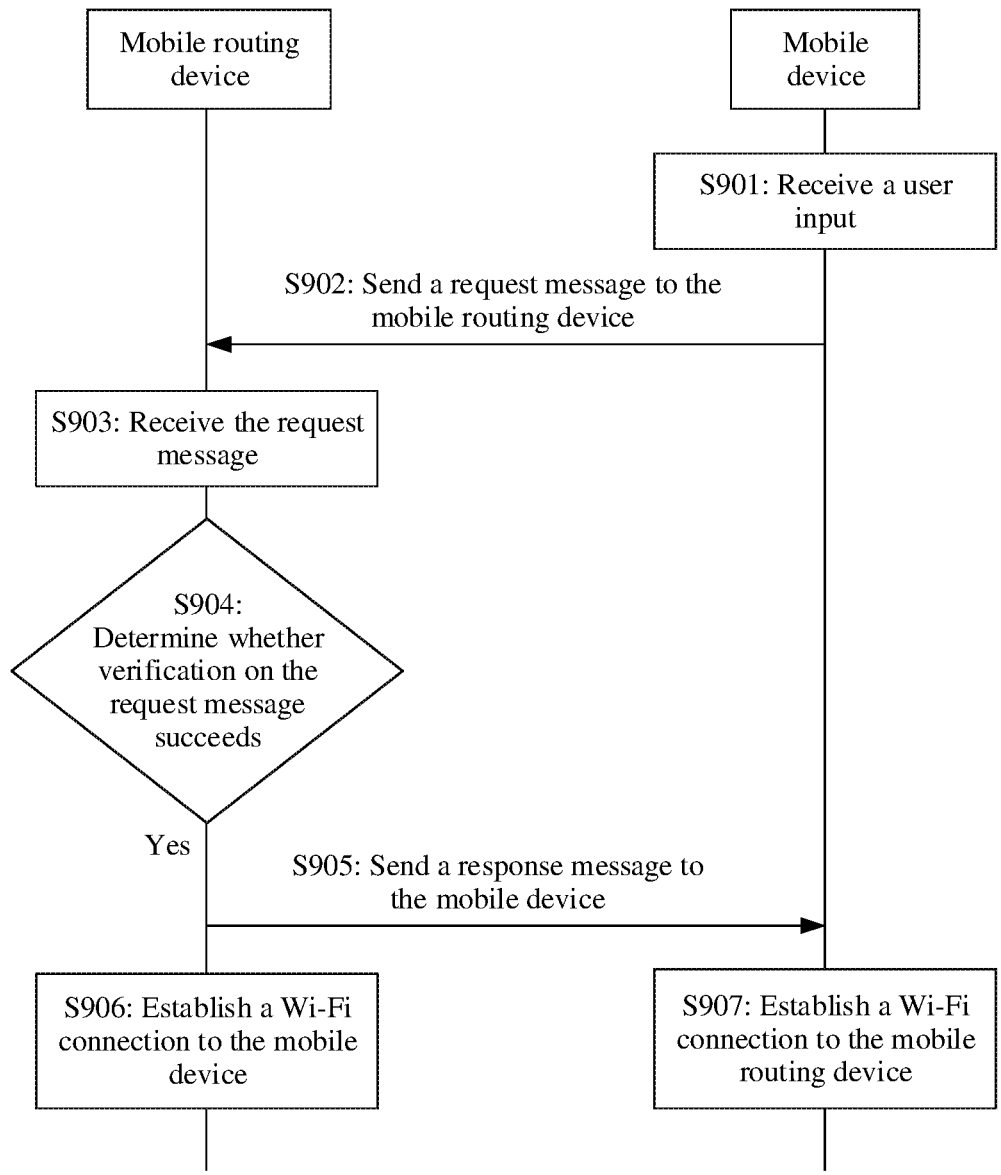
FIG. 9 is a flowchart in which a mobile routing device establishes a connection to a mobile device according to an embodiment of this disclosure.

FIG. 9 is a flowchart in which a mobile routing device establishes a connection to a mobile device according to an embodiment of this disclosure. FIG. 9 shows a process in which each of the M mobile devices establishes the Wi-Fi connection to the mobile routing device in S602 in FIG. 6, and the process specifically includes the following steps:

The mobile device receives a user input (S901). For example, after receiving the input from the user for enabling a Wi-Fi connection, the mobile device sends a request message to the mobile routing device (S902). For example, the request message may be an association request message. In an implementation, the request message includes an ID, an SSID, and a password of the mobile device. After receiving the request message (S903), the mobile routing device determines whether verification on the request message succeeds (S904). If the mobile routing device determines that verification on the request message succeeds, the mobile routing device sends a response message to the mobile device (S905). The response message is used to confirm that a Wi-Fi connection is established between the mobile device and the mobile routing device. After the mobile device receives the response message, a Wi-Fi connection is established between the mobile device and the mobile routing device (S906 and S907).

Figure 10:
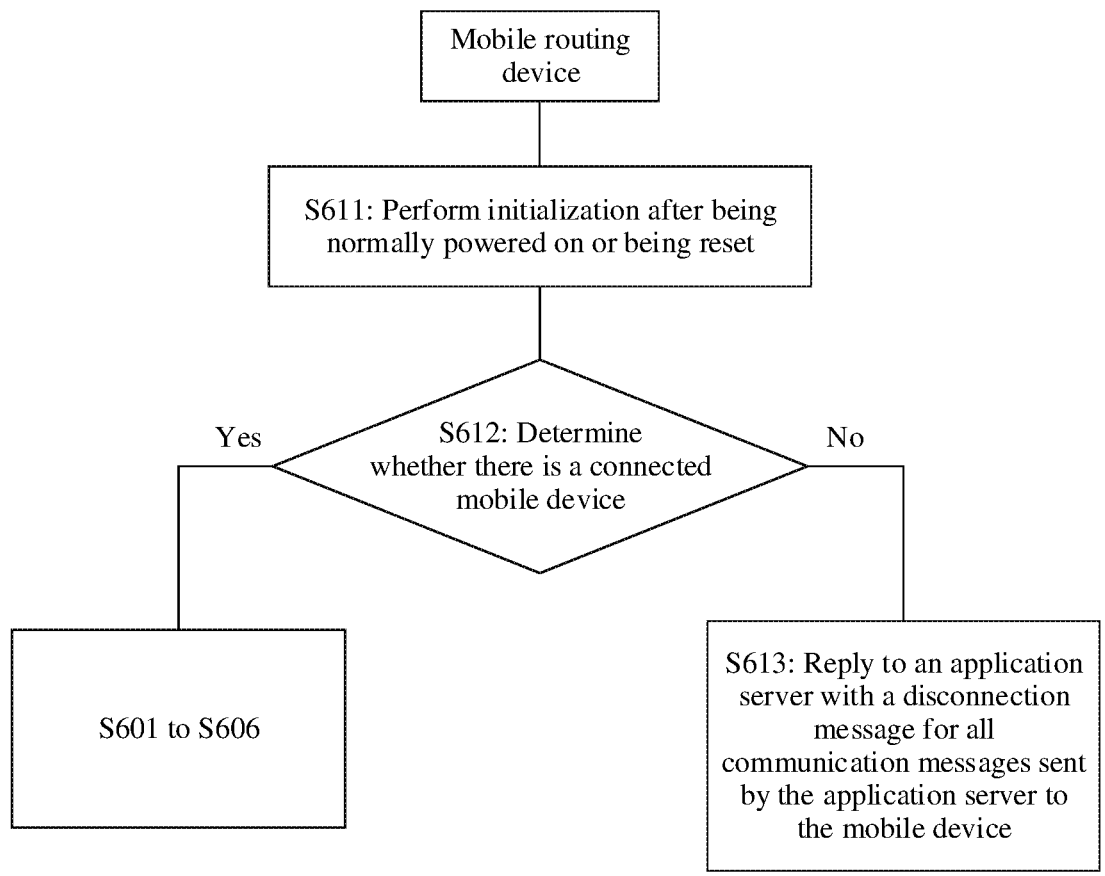
FIG. 10 is another flowchart of a sleep control method for a mobile routing device according to an embodiment of this disclosure.

Optionally, FIG. 10 is still another flowchart of a sleep control method for a mobile routing device according to an embodiment of this disclosure. Before S6oi in FIG. 6, the method provided in this embodiment of this disclosure may further include the following steps:

S611: The mobile routing device performs initialization after being normally powered on or being reset.

To avoid interference of the information previously stored in the mobile routing device to a current connection event or disconnection event, the mobile routing device performs initialization after being normally powered on or being reset, to clear recorded identification information of historical mobile devices that have disconnected the Wi-Fi connection between the historical mobile devices and the mobile routing device.

In some embodiments, the mobile routing device performs initialization, which is performed by the proxy module.

S612: The mobile routing device determines whether there is a connected mobile device.

If the mobile routing device determines that there is no currently connected mobile device, that is, no Wi-Fi connection is currently established between the mobile device and the mobile routing device, the mobile routing device performs S613.

If the mobile routing device determines that there is a currently connected mobile device, the mobile routing device performs S601 to S606 in FIG. 6.

S613: The mobile routing device replies to an application server with a disconnection message for all communication messages sent by the application server to the mobile device, to disconnect TCP links corresponding to the communication messages.

When no Wi-Fi connection is established between the mobile device and the mobile routing device, no communication message from the application server is received by the mobile device, and therefore no mobile device replies with the communication messages from the application server.

Therefore, as shown in FIG. 2, if the mobile routing device notifies, based on the network control message protocol ICMP message, the application server that a destination address is unreachable, the application server may resend a communication message to the mobile routing device for many times by using the TCP link previously established between the application server and the mobile device. In this way, the mobile routing device cannot stably and continuously enter a sleep state.

It should be noted that, the application server can send the communication message to the mobile device herein because the application server is connected to the mobile device before the mobile routing device is powered on or is reset this time, and then a TCP link is established between the mobile device and the application server. The application server responds to a service request sent by the mobile device to the application server when the mobile routing device is started last time, and replies with a service response. Due to a delay, a network or another factor, the service response is sent or resent by using the previously established TCP link after a current startup. Therefore, when no Wi-Fi connection is currently established between the mobile device and the mobile routing device, the mobile routing device may still receive the communication message sent by the application server to the mobile device by using the previously established TCP link. That is, the communication message is sent by the application server based on a TCP link between the application server and the mobile device.

To reduce power consumption of the mobile routing device, prolong standby duration, and therefore the mobile routing device can stably and continuously enter a sleep state, when no Wi-Fi connection is currently established between the mobile device and the mobile routing device, in S613, the mobile routing device replies to the application server with the disconnection message for all communication messages sent by the application server to the mobile devices, to disconnect a TCP link previously established between a mobile device corresponding to the communication message and the application server. Therefore, the application server sends no communication message to the mobile device by using the previously established TCP link, so that the mobile routing device can stably and continuously enter a sleep state, to reduce power consumption of the mobile routing device.

In some embodiments, to enable the mobile routing device to reply to the application server with the disconnection message for all communication messages sent by the application server to the mobile device, a reply object may be set to all "ALL", and TCP links corresponding to all communication messages are disconnected.

It may be learned from the foregoing description that the communication message in S613 is sent by the application server based on a TCP link. In some embodiments, the disconnection message is used to disconnect the TCP link. For example, the disconnection message may include a TCP reset packet or a TCP FIN packet.

In some embodiments, the disconnection message is used to disconnect all TCP links between the application server corresponding to the TCP link and the mobile devices. The disconnection message may be a message, where the message includes a plurality of TCP reset packets or TCP FIN packets, and each TCP reset packet or TCP FIN packet is used to disconnect one TCP link; the disconnection message includes a plurality of messages, where each message includes one TCP reset packet or TCP FIN packet, and each TCP reset packet or TCP FIN packet is used to disconnect one TCP link; or the disconnection message is a specific message.

In this way, after the mobile routing device is powered on or reset, when no mobile device is connected, the mobile routing device may send the disconnection message to the application server that sends the communication messages, to disconnect the TCP link previously established between the application server and the mobile device. Therefore, the application server sends no communication message to the mobile device by using the previously established TCP link, so that the mobile routing device can stably and continuously enter a sleep state, to reduce power consumption of the mobile routing device.

In some embodiments, the mobile routing device replies to the application server with the disconnection message for all communication messages sent by the application server to the mobile device, which is performed by the proxy module.

Each of the scenarios involved in the sleep control method for the mobile routing device described in FIG. 6 to FIG. 10 is a scenario in which no user accesses the mobile routing device, that is, a scenario in which all mobile devices connected to the mobile routing device disconnect Wi-Fi connections between the mobile devices and the mobile routing device. The following describes a sleep control method for a mobile routing device, which relates to a scenario in which no data is transmitted.

Figure 11:
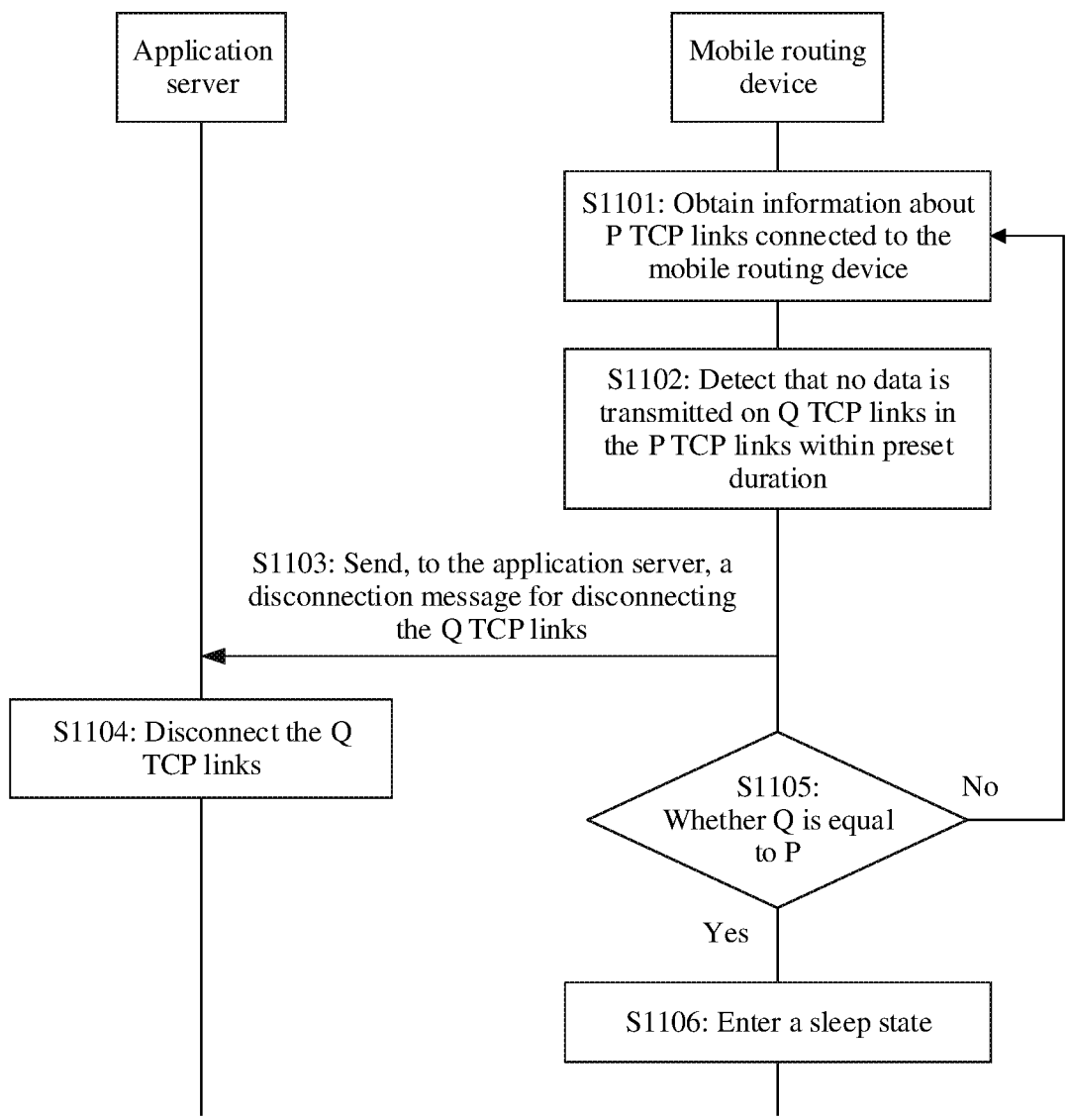
FIG. 11 is still another flowchart of a sleep control method for a mobile routing device according to an embodiment of this disclosure.

FIG. 11 is still another flowchart of a sleep control method for a mobile routing device according to an embodiment of this disclosure. As shown in FIG. 11, the method includes the following steps.

S1101: The mobile routing device obtains information about P TCP links connected to mobile devices.

P is a positive integer greater than or equal to 1. The information about the P TCP links is link information of the P TCP links for information forwarding between the mobile devices and application servers through the mobile routing device. Herein, there may be one or more mobile devices and application servers.

It may be understood that, when the mobile routing device obtains no information of the TCP links connected to the mobile devices, because no TCP link exists between the mobile devices and the application servers, the mobile routing device receive no communication message sent by the application servers based on the TCP links, and the mobile routing device is not woken up by the communication messages after entering a sleep state, so that the mobile routing device may directly enter a sleep state without performing sleep control.

S1102: The mobile routing device detects that no data is transmitted on Q TCP links in the P TCP links within preset duration.

Q is a positive integer greater than or equal to 1 and less than or equal to P. If no data is transmitted on the Q TCP links within the preset duration, the mobile devices corresponding to the Q TCP links may not disconnect the Wi-Fi connection between the mobile devices and the mobile routing device, but communication between the mobile devices and the application servers within the preset duration is not performed by using the Q TCP links. For example, no data is transmitted between the mobile device and the application server within the preset duration by using the Q TCP links.

In some embodiments, the preset duration herein may be preset by a user based on a requirement or experience. The preset duration is not limited in this disclosure.

S1103: The mobile routing device sends, to the application server, a disconnection message for disconnecting the Q TCP links.

There may be one or more application servers corresponding to the Q TCP links. Correspondingly, the mobile routing device may send the disconnection message to one or more application servers.

In some embodiments, when the mobile routing device detects that no data is transmitted on a TCP link within the preset duration, the mobile routing device may send, to an application server corresponding to the TCP link, a disconnection message for disconnecting the TCP link. It may also be considered that, in this case, Q is equal to 1. The disconnection message may be a message including a TCP reset packet or a TCP FIN packet.

In some embodiments, when the mobile routing device periodically detects that no data is transmitted on the Q TCP links within the preset duration, the mobile routing device may send, to an application server corresponding to the Q TCP links, a disconnection message for disconnecting the TCP links. The foregoing sending may be performed simultaneously, or may be performed at intervals. The disconnection message herein may be a set of a plurality of TCP reset packets or TCP FIN packets, or may be a specific message.

Because no data is transmitted on the Q TCP links within the preset duration, that is, the mobile device does not communicate with the application server within the preset duration by using the Q TCP links. Therefore, the mobile routing device may act, based on link information of the Q TCP links, as a proxy for the mobile devices to send the disconnection message to the corresponding application server, to disconnect the Q TCP links. In this way, the mobile routing device receives no communication message sent on the Q TCP links, to reduce possibility that the mobile routing device is frequently woken up after entering a sleep state, and even avoid being frequently woken up, so that running duration is prolonged. In addition, the application server sends no communication message by using the Q TCP links, so that power consumption of the application server can be reduced.

S1104: The application server disconnects the Q TCP links.

After receiving the disconnection message, the application server disconnects corresponding TCP links, that is, the Q TCP links.

S1105: The mobile routing device detects whether Q is equal to P. After detecting that Q is equal to P, the mobile routing device performs S1106; or after detecting that Q is not equal to P, the mobile routing device continues to perform S1101 to S1105, and even S1106.

S1106: The mobile routing device enters a sleep state.

After the mobile routing device detects that Q is equal to P, it indicates that no data is transmitted on all TCP links between the mobile device and the application server, and the mobile routing device sends a disconnection message to the application server corresponding to all the TCP links, to disconnect all the TCP links between the mobile device and the application server. In other words, after the mobile routing device detects that Q is equal to P, the TCP links between the mobile device and the application server are all disconnected. The mobile routing device performs S1106, and the mobile routing device stably enters a sleep state.

Because the TCP links between the application server and the mobile device are all disconnected, the application server sends no communication message to the mobile device through the mobile routing device by using the TCP link, and correspondingly, the mobile routing device is not frequently woken up by the communication message sent by the application server. In this way, the mobile routing device stably enters a sleep state, so that power consumption of the mobile routing device is reduced, and standby duration of the mobile routing device is prolonged.

After detecting that Q is not equal to P, the mobile routing device performs iterative update on a quantity P of currently connected TCP links, and subtracts the Q disconnected TCP links. Further, a quantity of newly connected TCP links may be added. In addition, the mobile routing device continues to perform S1101, that is, obtain information about P TCP links connected to mobile devices. It may also be understood that, the mobile routing device performs iterative update on the quantity P of connected TCP links until no data is transmitted on the TCP links on which the mobile device and the application server perform information forwarding through the mobile routing device, the mobile routing device acts as a proxy for the mobile device to send a disconnection message to the application server. After all TCP links are disconnected, the mobile routing device stably enters a sleep state.

An embodiment of this disclosure provides a proxy wake-up control method for a mobile routing device. According to the method, when no data is transmitted on a TCP link established between a mobile device and an application server through the mobile routing device, the mobile routing device acts, based on link information of the TCP link, as a proxy for the mobile device to send a disconnection message to the corresponding application server, to disconnect the TCP link without data transmission. When no data is transmitted on all TCP links, and the mobile routing device sends disconnection messages to the application server corresponding to all the TCP links, all the TCP links are disconnected. In this case, the application server sends no communication message to mobile devices through the mobile routing device by using the TCP links. Correspondingly, the mobile routing device is not frequently woken up by the communication message sent by the application server. In this way, the mobile routing device stably enters a sleep state, so that batter power is saved, power consumption is reduced, and standby duration is prolonged.

It can be learned from the descriptions of the foregoing embodiment that, according to the sleep control method for the mobile routing device provided in this embodiment of this disclosure, power consumption can be effectively reduced. For example, it is assumed that a battery capacity is Cap_bat (mAh), a current of the mobile routing device is I_work (mA) when the mobile routing device is woken up, a current of the mobile routing device is I_sleep (mA) when the mobile routing device is in a standby state, and duration from being woken up to entering a sleep state again by the mobile routing device is t (h), each time a sleep scenario is triggered, a power saving benefit of the sleep control method for the mobile routing device provided in this embodiment of this disclosure is (I_work−I_sleep)*t/Cap_bat*100%. It can be seen that a larger difference between a current of the mobile routing device when the mobile routing device is woken up and a current of the mobile routing device when the mobile routing device is in a standby state indicates longer duration from being woken up to entering a sleep state again by the mobile routing device, and a higher power saving benefit of the sleep control method for the mobile routing device provided in this embodiment of this disclosure. In a 5G network, a current of the mobile routing device when the mobile routing device is in a standby state has a greater difference than a current of the mobile routing device when the mobile routing device is woken up, and therefore a power saving benefit of the sleep control method for the mobile routing device provided in this embodiment of this disclosure is considerable.

It should be noted that the foregoing sleep control method for the mobile routing device is also applicable to other routing devices. For example, the method provided in this embodiment of this disclosure is still applicable to a routing device powered by a power cable. According to the sleep control method provided in this embodiment of this disclosure, power consumption of the routing device can be reduced, and battery power is saved, to implement environmental protection.

It may be understood that, to implement the foregoing functions, the mobile routing device includes a corresponding hardware and/or software module for performing each function. Algorithm steps in the examples described with reference to embodiments disclosed in this specification can be implemented by hardware or a combination of hardware and computer software in this disclosure. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this disclosure.

In embodiments, function module division may be performed on the mobile routing device based on the foregoing method examples. For example, each function module may be obtained through division based on a corresponding function, or two or more functions may be integrated into one processing module. The integrated module may be implemented in a form of hardware. It should be noted that, in embodiments, module division is an example, is merely logical function division, and may be other division during actual implementation.

Figure 12:
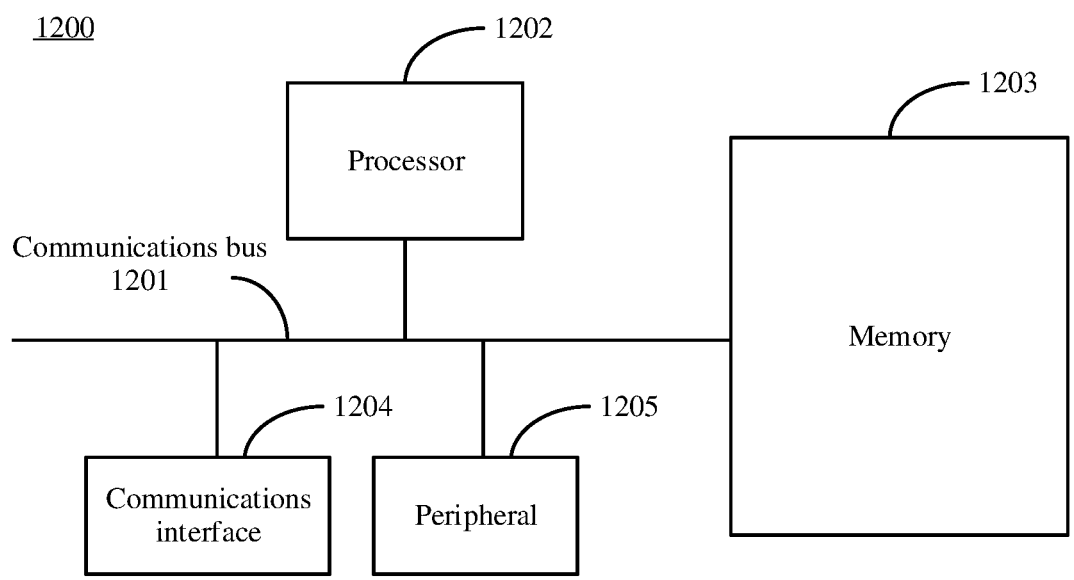
FIG. 12 is a schematic diagram of a structure of a mobile routing device according to an embodiment of this disclosure.

For example, FIG. 12 is a schematic diagram of a structure of a mobile routing device according to an embodiment of this disclosure. As shown in FIG. 12, this embodiment of this disclosure provides a mobile routing device 1200, including a communications bus 1201, and a processor 1202, a memory 1203, a communications interface 1204, and a peripheral 1205 that are connected by using the bus 1201. The communications interface 1203 may be used to communicate with another device. The memory 1202 stores code. When the code is executed by the processor 1201, the mobile routing device 1200 is enabled to perform the foregoing related method steps, to implement the sleep control method for the mobile routing device in the foregoing embodiments.

An embodiment of this disclosure further provides a computer-readable storage medium. The computer-readable storage medium stores a computer program, and when the computer program is run on a mobile routing device, the mobile routing device is enabled to perform the foregoing related method steps, to implement the sleep control method for the mobile routing device in the foregoing embodiments.

An embodiment of this disclosure further provides a computer program product. When the computer program product is run on a mobile routing device, the mobile routing device is enabled to perform the foregoing related method steps, to implement the sleep control method that is used for the mobile routing device and that is performed by the mobile routing device in the foregoing embodiments.

In addition, an embodiment of this disclosure further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, and the chip is enabled to perform the sleep control method that is used for the mobile routing device and that is performed by the mobile routing device in the foregoing method embodiments.

The mobile routing device, the computer-readable storage medium, the computer program product, or the chip provided in embodiments of this disclosure may be all configured to perform the corresponding method provided above. Therefore, for beneficial effects that can be achieved, refer to beneficial effects in the corresponding method provided above. Details are not described herein.

An embodiment of this disclosure provides a communications system. The communications system may include the foregoing mobile routing device and at least one mobile device. The mobile routing device may be configured to implement the foregoing sleep control method for the mobile routing device.

The descriptions about the foregoing implementations allow a person skilled in the art to understand that, for convenient and brief description, division into the foregoing function modules is taken as an example for illustration. In actual application, the foregoing functions can be allocated to different function modules and implemented according to a requirement, that is, an inner structure of an apparatus is divided into different function modules to implement all or some of the functions described above.

In the several embodiments provided in this disclosure, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this disclosure essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this disclosure. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this disclosure, but is not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A mobile routing device comprises:
one or more processors;
one or more non-transitory memories; and
one or more computer programs, wherein the one or more computer programs are stored in the one or more memories, and when the one or more computer programs are executed by the one or more processors, the mobile routing device is caused to perform:
obtaining identification information of M mobile devices connected to the mobile routing device in a wireless communication manner;
after detecting that N mobile devices in the M mobile devices are disconnected from the mobile routing device, obtaining, based on the identification information of the M mobile devices, identification information and transmission control protocol (TCP) link information of the N mobile devices, wherein the TCP link information of the N mobile devices indicates one or more application servers, N is less than or equal to M, and N and M are integers greater than or equal to 1;

after obtaining the identification information and the TCP link information of the N mobile devices, sending disconnection messages to the one or more application servers, wherein the disconnection messages indicate to disconnect TCP links that correspond to the N mobile devices and that are between the mobile routing device and the one or more application servers; and upon detecting that N is equal to M, entering, by the mobile routing device, a sleep state.

2. The mobile routing device of claim 1, wherein the mobile routing device further performs:

upon detecting that N is not equal to M, obtaining identification information of K mobile devices of the M mobile devices that are connected to the mobile routing device, and updating M to K, wherein K is an integer greater than or equal to 1.

3. The mobile routing device of claim 1, wherein after obtaining the identification information of the M mobile devices, the mobile routing device is further caused to perform:

receiving one or more first messages from the N mobile devices; and detecting, in response to the one or more first messages, that the N mobile devices in the M mobile devices are disconnected from the mobile routing device.

4. The mobile routing device of claim 1, wherein after obtaining the identification information of the M mobile devices, the mobile routing device is further caused to perform:

when the mobile routing device does not receive messages of the N mobile devices within preset duration, detecting that the N mobile devices in the M mobile devices are disconnected from the mobile routing device.

5. The mobile routing device of claim 4, wherein the messages of the N mobile devices are keepalive messages, and the keepalive messages are used to indicate that the N mobile devices keep connections to the mobile routing device.

6. A mobile routing device comprising:
one or more processors;
one or more non-transitory memories; and
one or more computer programs, wherein the one or more computer programs are stored in the one or more memories, and when the computer programs are executed by the one or more processors, the mobile routing device is caused to perform:

obtaining information about P transmission control protocol (TCP) links, the P TCP links being established between M mobile devices and N application servers through the mobile routing device, and the mobile routing device being connected to the M mobile devices in a wireless communication manner;

after detecting that no data is transmitted on Q TCP links in the P TCP links within preset duration, sending disconnection messages to T application servers, of the N application servers, indicated by the Q TCP links, wherein the disconnection messages indicate to disconnect the Q TCP links between the mobile routing device and the T application servers; and upon detecting that Q is equal to P, entering a sleep state, wherein M, N, P, Q, and T are integers greater than or equal to 1, Q is less than or equal to P, and T is less than or equal to N.

7. The mobile routing device of claim 6, wherein the mobile routing device is further caused to perform:

upon detecting that Q is not equal to P, obtaining information about L TCP links, and updating P to L, wherein L is an integer greater than or equal to 1.

8. The mobile routing device of claim 7, wherein detecting that no data is transmitted on the Q TCP links in the P TCP links within the preset duration comprises:

detecting that no data from the M mobile devices is transmitted on the Q TCP links in the P TCP links within the preset duration.

9. The mobile routing device of claim 6, wherein detecting that no data is transmitted on the Q TCP links in the P TCP links within the preset duration comprises:

detecting that no data from the M mobile devices is transmitted on the Q TCP links in the P TCP links within the preset duration.

10. A method, applied to a mobile routing device, wherein the method comprises:

obtaining identification information of M mobile devices connected to the mobile routing device in a wireless communication manner;

after detecting that N mobile devices in the M mobile devices are disconnected from the mobile routing device, obtaining, based on the identification information of the M mobile devices, identification information and transmission control protocol (TCP) link information of the N mobile devices, wherein the TCP link information of the N mobile devices indicates one or more application servers, N is less than or equal to M, and N and M are integers greater than or equal to 1;

after obtaining the identification information and the TCP link information of the N mobile devices, sending disconnection messages to the one or more application servers, wherein the disconnection messages indicate to disconnect TCP links that correspond to the N mobile devices and that are between the mobile routing device and the one or more application servers; and upon detecting that N is equal to M, entering a sleep state.

11. The method of claim 10, wherein the method further comprises:

upon detecting that N is not equal to M, obtaining identification information of K mobile devices of the M mobile devices that are connected to the mobile routing device, and updating M to K, wherein K is an integer greater than or equal to 1.

12. The method of claim 11, wherein after obtaining the identification information of the M mobile devices, the method further comprises:

receiving one or more first messages from the N mobile devices; and detecting, in response to the one or more first messages, that the N mobile devices in the M mobile devices are disconnected from the mobile routing device.

13. The method of claim 11, wherein after obtaining the identification information of the M mobile devices, the method further comprises:

when the mobile routing device does not receive messages of the N mobile devices within preset duration, detecting that the N mobile devices in the M mobile devices are disconnected from the mobile routing device.

14. The method of claim 10, wherein after obtaining the identification information of the M mobile devices, the method further comprises:

receiving one or more first messages from the N mobile devices; and detecting, in response to the one or more first messages, that the N mobile devices in the M mobile devices are disconnected from the mobile routing device.

15. The method of claim 10, wherein after obtaining the identification information of the M mobile devices, the method further comprises:

when the mobile routing device does not receive messages of the N mobile devices within preset duration, detecting that the N mobile devices in the M mobile devices are disconnected from the mobile routing device.

16. The method of claim 15, wherein the messages of the N mobile devices are keepalive messages, and the keepalive messages are used to indicate that the N mobile devices keep connections to the mobile routing device.

17. A method applied to a mobile routing device, wherein the method comprises:

obtaining information about P transmission control protocol (TCP) links, the P TCP links being established between M mobile devices and N application servers through the mobile routing device, and the mobile routing device being connected to the M mobile devices in a wireless communication manner;

after detecting that no data is transmitted on Q TCP links in the P TCP links within preset duration, sending disconnection messages to T application servers, of the N application servers, indicated by the Q TCP links, wherein the disconnection messages indicate to disconnect the Q TCP links between the mobile routing device and the T application servers; and upon detecting that Q is equal to P, entering a sleep state, wherein M, N, P, Q, and T are integers greater than or equal to 1, Q is less than or equal to P, and T is less than or equal to N.

18. The method of claim 17, wherein the method further comprises:

upon detecting that Q is not equal to P, obtaining information about L TCP links, and updating P to L, wherein L is a positive integer greater than or equal to 1.

19. The method of claim 18, wherein detecting that no data is transmitted on the Q TCP links in the P TCP links within the preset duration comprises:

detecting that no data from the M mobile devices is transmitted on the Q TCP links in the P TCP links within the preset duration.

20. The method of claim 17, wherein detecting that no data is transmitted on the Q TCP links in the P TCP links within the preset duration comprises:

detecting that no data from the M mobile devices is transmitted on the Q TCP links in the P TCP links within the preset duration.

* * * * *